United States Patent
Yang et al.

(10) Patent No.: US 10,775,185 B2
(45) Date of Patent: Sep. 15, 2020

(54) METHOD AND APPARATUS FOR ACQUIRING ROUTE POPULARITY IN ROAD NETWORKS

(71) Applicant: ALIBABA GROUP HOLDING LIMITED, George Town, Grand Cayman (KY)

(72) Inventors: Jianwei Yang, Hangzhou (CN); Yinzi Ren, Hangzhou (CN); Yan Sun, Hangzhou (CN); Bangyu Xiang, Hangzhou (CN); Yu Xu, Hangzhou (CN); Yaguang Liu, Hangzhou (CN)

(73) Assignee: ALIBABA GROUP HOLDING LIMITED, George Town, Grand Cayman (KY)

( * ) Notice: Subject to any disclaimer, the term of this patent is extended or adjusted under 35 U.S.C. 154(b) by 151 days.

(21) Appl. No.: 16/017,965

(22) Filed: Jun. 25, 2018

(65) Prior Publication Data
US 2018/0306594 A1 Oct. 25, 2018

Related U.S. Application Data

(63) Continuation of application No. PCT/CN2016/109565, filed on Dec. 13, 2016.

(30) Foreign Application Priority Data
Dec. 24, 2015 (CN) .......................... 2015 1 0990052

(51) Int. Cl.
G01C 21/34 (2006.01)
G08G 1/01 (2006.01)
(Continued)

(52) U.S. Cl.
CPC ..... *G01C 21/3461* (2013.01); *G01C 21/3446* (2013.01); *G01C 21/3476* (2013.01);
(Continued)

(58) Field of Classification Search
CPC ............ G01C 21/3461; G01C 21/3484; G01C 21/3476; G01C 21/3682; G01C 21/3635;
(Continued)

(56) References Cited

U.S. PATENT DOCUMENTS

| | | | |
|---|---|---|---|
| 2011/0087431 A1* | 4/2011 | Gupta | G01S 5/0018 701/408 |
| 2015/0262480 A1 | 9/2015 | Fowe et al. | |
| 2016/0123743 A1* | 5/2016 | Sisbot | G01C 21/3461 701/538 |

FOREIGN PATENT DOCUMENTS

| | | |
|---|---|---|
| CN | 1828228 A | 9/2006 |
| CN | 103106787 A | 5/2013 |

(Continued)

OTHER PUBLICATIONS

First Search Report issued in corresponding International Application No. 201510990052.2 (1 pg.).
(Continued)

*Primary Examiner* — Rodney A Butler
(74) *Attorney, Agent, or Firm* — Finnegan, Henderson, Farabow, Garrett & Dunner, LLP

(57) ABSTRACT

The present disclosure provides methods and apparatuses for acquiring route popularity in road networks. The methods include: acquiring a plurality of points of interest (POIs) included in road networks and positioning data of a plurality of positioning terminals; mapping the positioning data of a respective positioning terminal of the plurality of positioning terminals to the plurality of POIs included in the road networks to obtain one or more POIs associated with the respective positioning terminal; acquiring a travel route map of the respective positioning terminal according to the one or more POIs associated with the respective positioning terminal; acquiring a preferred travel route of the respective positioning terminal according to the travel route map of the
(Continued)

respective positioning terminal, the preferred travel route including a plurality of paths frequently used by the respective positioning terminal; and aggregating a plurality of preferred travel routes of the plurality of positioning terminals respectively to obtain a route popularity distribution map of the road networks.

21 Claims, 18 Drawing Sheets

(51) Int. Cl.
    *G01C 21/36*     (2006.01)
    *H04L 29/06*     (2006.01)
    *H04L 29/08*     (2006.01)

(52) U.S. Cl.
    CPC ..... *G01C 21/3484* (2013.01); *G01C 21/3635* (2013.01); *G01C 21/3682* (2013.01); *G08G 1/012* (2013.01); *G08G 1/0125* (2013.01); *G08G 1/0129* (2013.01); *H04L 67/12* (2013.01); *H04L 67/18* (2013.01); *H04L 69/18* (2013.01)

(58) Field of Classification Search
    CPC ..... G01C 21/3446; H04L 69/18; H04L 67/18; H04L 67/12; G08G 1/0129; G08G 1/012; G08G 1/0125
    See application file for complete search history.

(56) References Cited

FOREIGN PATENT DOCUMENTS

| CN | 103323018 A | 9/2013 |
|---|---|---|
| CN | 103389093 A | 11/2013 |
| CN | 104239453 A | 12/2014 |
| CN | 104299414 A | 1/2015 |
| CN | 104537830 A | 4/2015 |
| CN | 104850604 A | 8/2015 |
| CN | 104990551 A | 10/2015 |
| JP | 2010203796 A | 9/2010 |
| WO | WO 2017/107800 A1 | 6/2017 |

OTHER PUBLICATIONS

First office Action issued by The State Intellectual Property Office of People's Republic of China in corresponding Chinese Application No. 201510990052.2; dated Jan. 29, 2019 (19 pgs.).

Second Office Action issued by The State Intellectual Property Office of People's Republic of China in corresponding Chinese Application No. 201510990052.2; dated Sep. 6, 2019 (20 pgs.).

PCT International Preliminary Report on Patentability, International Written Opinion and International Search Report in corresponding PCT Application No. PCT/CN2016/109565; dated Mar. 17, 2017 (18 pgs.).

\* cited by examiner

METHOD AND APPARATUS FOR ACQUIRING ROUTE POPULARITY IN ROAD NETWORKS

This application claims priority to International Application No. PCT/CN2016/109565, filed on Dec. 13, 2016, which claims priority to and the benefits of priority to Chinese Application No. 201510990052.2, filed on Dec. 24, 2015, both of which are incorporated herein by reference in their entireties.

TECHNICAL FIELD

The present disclosure generally relates to the field of internet technology, and in particular, to methods and apparatuses for acquiring traffic route popularity.

BACKGROUND

With rapid economic and social developments, traffic problems have become increasingly severe in urban areas. Traffic jams and congestions greatly affect people's traveling. The increasing amount of time spent on daily commutes also severely reduces production efficiency and work efficiency for the society as a whole, and affects people's happiness index.

Existing technologies seek to address the foregoing problems by using methods for extracting real-time urban traffic flow data based on positioning data of a mobile phone. One such method includes: preprocessing positioning data of a mobile phone and map data; determining candidate matching road sections of the positioning data and a roughly-chosen matching point set of each road section; extracting vehicle-mounted mobile phone data, i.e., determining a finely-chosen matching point set of each road section; and calculating an average space velocity for the road sections by using a weighted average velocity method.

The existing methods of extracting real-time urban traffic flow data based on positioning data of a mobile phone has a number of disadvantages, which include complex data extraction and processing, difficulty in actual operation and deployment, and high implementation costs. For example, the disadvantages are manifested in the following aspects.

With the existing methods, it is required to use an electronic map as an input to extract urban road network information. Further, the methods require establishing a storage unit for each road section for storing its road section serial number, road section direction, road section function grade, and road section space data. The methods also require selecting matching point sets for the road sections. The process involves a significant amount of data processing and complex calculations, and the operations are not suitable for automatic execution.

Further, in the existing technology, it is required to extract vehicle-mounted mobile phone data to determine a finely-chosen matching point set of each road section and estimate an average space velocity of the road section by using a space velocity weighted method. Unless the vehicle-mounted mobile phones are deployed manually for data collection, the source of positioning data needs to be verified, which affects applicability of the methods. In addition, it is extremely difficult to continuously acquire precise positioning data of an individual mobile phone. Therefore, the foregoing methods, although operable theoretically, are difficult to apply in practice.

In view of the above, existing methods of extracting urban traffic flow data based on mobile phone positioning data have the problems of low efficiency in determining popularity of traffic routes, due to complex traffic data extraction and processing operations. There is a need for effective solutions to solve the problems.

SUMMARY

Embodiments of the present disclosure provide methods and apparatuses for acquiring route popularity in road networks. One objective of the embodiments of the present disclosure is to address the technical problem of low efficiency in determining route popularity in road networks due to complex traffic data extraction and processing procedures.

According to some embodiments of the present disclosure, methods for acquiring route popularity in road networks are provided. One exemplary method comprises: acquiring a plurality of points of interest (POIs) included in road networks and positioning data of a plurality of positioning terminals, wherein the positioning data includes location information of the positioning terminals during movement in the road networks; mapping the positioning data of each positioning terminal to the POIs included in the road networks to obtain one or more POIs associated with the positioning terminal; acquiring a travel route map of each positioning terminal according to the one or more POIs associated with the positioning terminals; acquiring a preferred travel route of each positioning terminal according to the travel route map of each positioning terminal; and aggregating the preferred travel routes of the positioning terminals to obtain a route popularity distribution map of the road networks.

According to some embodiments of the present disclosure, apparatuses for acquiring route popularity in road networks are further provided. One exemplary apparatus comprises: a first acquisition module configured to acquire a plurality of POIs included in road networks and positioning data of a plurality of positioning terminals, wherein the positioning data includes location information of the positioning terminals during movement in the road networks; a mapping module configured to map the positioning data of each positioning terminal to the POIs included in the road networks to obtain one or more POIs associated with the positioning terminal; a second acquisition module configured to acquire a travel route map of each positioning terminal according to the one or more POIs associated with the positioning terminals; a third acquisition module configured to acquire a preferred travel route of each positioning terminal according to the travel route map of each positioning terminal; and an aggregating module configured to aggregate the preferred travel routes of the positioning terminals to obtain a route popularity distribution map of the road networks.

According to some embodiments of the present disclosure, a plurality of POIs included in road networks and positioning data of a plurality of positioning terminals are acquired. The positioning data includes location information of the positioning terminals during movement in the road networks. The positioning data of each positioning terminal can be mapped to the POIs included in the road networks to obtain POIs associated with the positioning terminal in the road networks. A travel route map of each positioning terminal can be acquired according to the POIs associated with the positioning terminal in the road networks. A preferred travel route of each positioning terminal can be acquired according to the travel route map of each positioning terminal. The preferred travel routes of the positioning terminals can be aggregated to obtain a route popularity distribution map of the road networks. The embodiments of the present disclosure can achieve the objective of determining route popularity in road networks without the need of collecting positioning data of positioning terminals in real time. This may help achieving the technical effect of determining route popularity in road networks more accurately and efficiently, and can therefore address the technical problem of low efficiency in determining route popularity in road networks due to complex traffic data extraction and processing procedures.

BRIEF DESCRIPTION OF THE DRAWINGS

The accompanying drawings described here are used to facilitate better understanding of the present disclosure and constitute a part of the present disclosure. The exemplary embodiments of the present disclosure and the description of the embodiments are used to illustrate the present disclosure, and do not constitute any improper limitation to the scope of present disclosure. In the drawings.

DETAILED DESCRIPTION

To facilitate better understanding of the present disclosure, reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods according to some embodiments of the present disclosure, the scope of which is defined by the appended claims. Based on the embodiments described herein in the present disclosure, other embodiments obtained by those of ordinary skill in the art without departing from the spirit or concept of the present disclosure shall all fall within the protection scope of the present disclosure.

It is appreciated that that terms such as "first" and "second" in the specification, claims, and accompanying drawings of the present disclosure are used for distinguishing similar objects, and do not necessarily indicate any particular sequence or order. It should be appreciated that the numbers used in such a manner can be interchanged in proper situations. That is, the embodiments of the present disclosure described here can be implemented in sequences other than those depicted or described here. In addition, the terms "include," "have" or any variations thereof are intended to cover non-exclusive inclusion. For example, a process, method, system, product, or device including a series of steps or units not only can include the steps or units expressly listed, but can also include other steps or units that are not expressly listed or other steps or units inherent to the process, method, product, or device.

According to some embodiments of the present disclosure, methods for acquiring route popularity in road networks are provided. It is appreciated that steps shown in the flowcharts of the accompanying drawings can be performed by a computer system executing a group of computer executable instructions. Moreover, although a logic sequence is shown in the flowchart, the shown or described steps may be executed in a sequence different from the ones shown or described herein.

Figure 1:
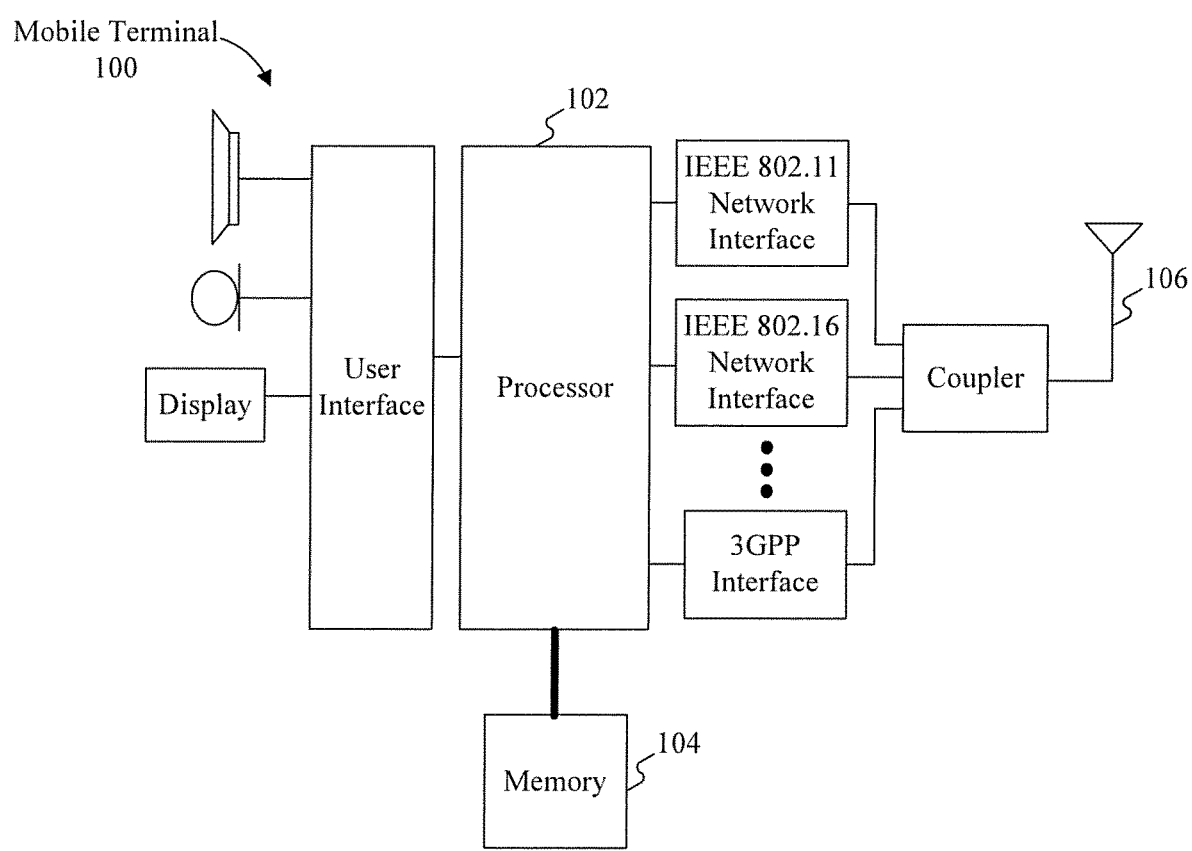
FIG. 1 is a block diagram of an exemplary mobile terminal used for performing a method of acquiring route popularity in road networks, according to some embodiments of the present disclosure.

For example, methods according to some embodiments of the application can be executed in in a mobile terminal, a computer terminal, or a similar arithmetic unit. The disclosure herein uses a computer terminal as an example. FIG. 1 is a block diagram of an exemplary mobile computer terminal 100 used for performing a method of acquiring route popularity in road networks, according to some embodiments of the present disclosure. As shown in FIG. 1, computer terminal 100 may include one or more (only one is shown in the figure) processors 102, a memory 104 used for storing data, and a transmission module 106 used for communication transmission. The processor 102 may include, but is not limited to, a microprogrammed control unit (MCU), a field programmable gate array (FPGA), or other processing apparatuses. It is appreciated that the structure shown in FIG. 1 is merely an example, which does not limit the structure of the foregoing electronic apparatus. For example, computer terminal 100 may further include more or fewer components than those shown in FIG. 1 or have a configuration different from that shown in FIG. 1.

In some embodiments, memory 104 can be used for storing programs and modules of application software, for example, program instructions or modules corresponding to methods for acquiring route popularity in road networks according to the embodiments of the present disclosure. Processor 102 can execute the software programs and modules stored in memory 104 to implement various functional applications and data processing operations, corresponding to the embodiments of the present disclosure. In some embodiments, memory 104 can include a high-speed random access memory and can further include a non-volatile memory such as one or more magnetic storage apparatuses, a flash memory, or other non-volatile solid-state memories. In some embodiments, memory 104 can further include memories remotely disposed with respect to processor 102, such as memories in a cloud network. The remote memories can be connected to computer terminal 100 through a network. Examples of the network include, but are not limited to, the internet, an intranet, a local area network, a mobile communications network, and a combination thereof.

Transmission apparatus 106 can be used for receiving or sending data through a network. Examples of the network can include a wireless network provided by a communications provider of computer terminal 100. In some embodiments, transmission apparatus 106 can include a network interface controller (NIC), which can be connected to another network device through a base station and is thereby able to communicate with the internet. In some embodiments, transmission apparatus 106 can include a radio frequency (RF) module, which can be used for communicating with the internet in a wireless manner.

Figure 2:
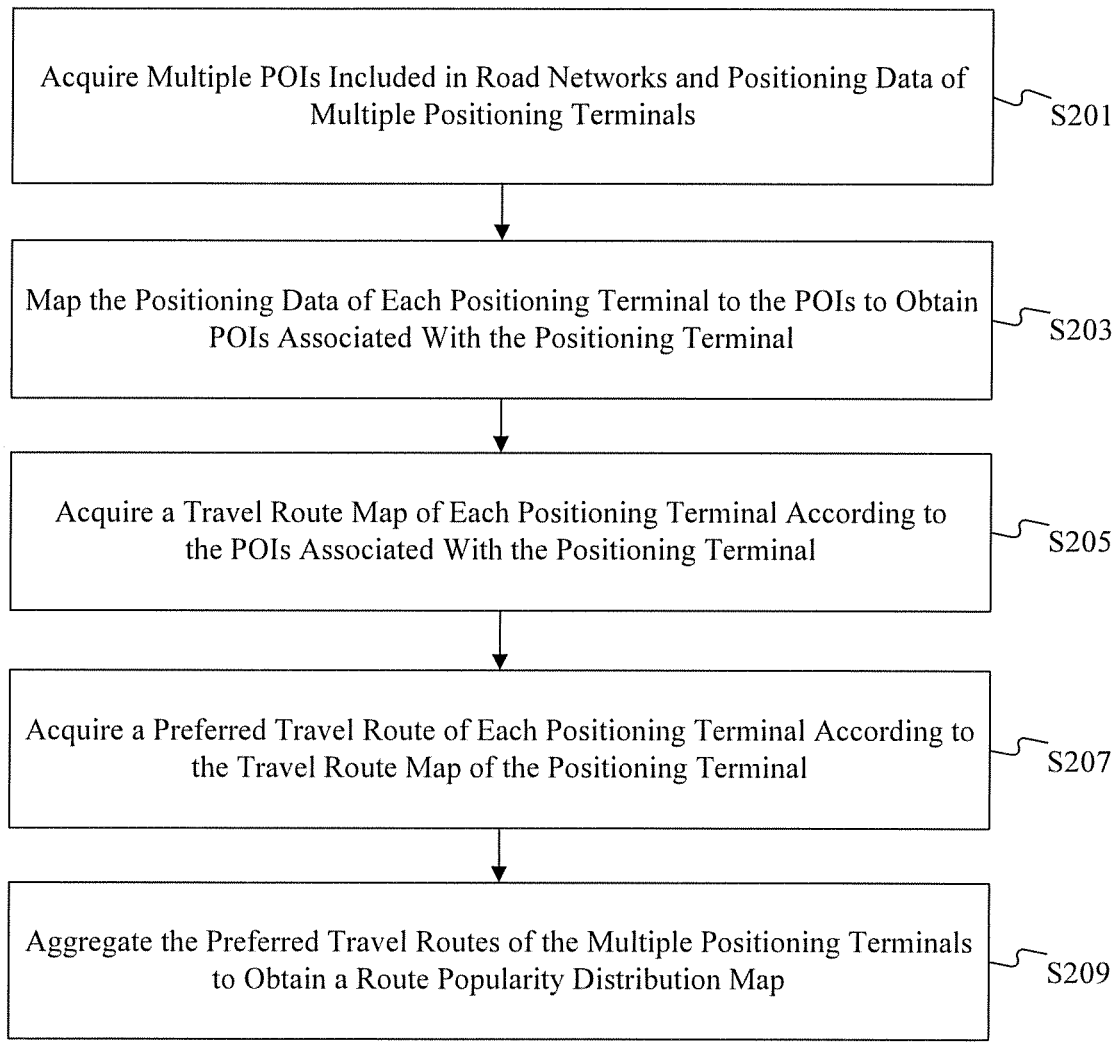
FIG. 2 is a flowchart of an exemplary method for acquiring route popularity in road networks, according to some embodiments of the present disclosure.

According to some embodiments of the present disclosure, methods for acquiring route popularity in road networks are provided. FIG. 2 is a flowchart of an exemplary method 200 for acquiring route popularity in road networks, according to some embodiments of the present disclosure. As shown in FIG. 2, the exemplary method 200 includes the following steps.

In step S201, multiple POIs included in road networks and positioning data of multiple positioning terminals are acquired. The positioning data can include location information of the positioning terminals during movement in the road networks.

In some embodiments, a POI in the road networks can be an independent geographical indication point in a geographic information system. Institutions, shops, and public facilities can be organized and further divided according to the types of POIs. Each POI has associated information such as type, name, address, and geographical location coordinates.

For example, there are two types of positioning technologies. One is positioning based on the global positioning system (GPS), and the other is positioning based on a base station of a mobile operational network. For positioning based on GPS, a location signal of a mobile phone is sent to a positioning back-end by using a GPS positioning module on the mobile phone, so as to position the mobile phone. For positioning based on a base station, the base station measures a distance to a mobile phone, to determine a location of the mobile phone.

In the exemplary method 200, multiple POIs in road networks and positioning data of multiple positioning terminals can be acquired at the same time in step S201. The POIs can be further combined with mobile positioning data of users to facilitate location based services (LBSs) such as positioning, navigation, and query. POIs and terminals whose information needs to be acquired can be determined based on regions, or can be specified in advance.

As an example, a server can acquire POIs included in a region A and at the same time monitor region A in real time. So the server can acquire positioning data of positioning terminals that enter region A or move around in region A.

In step S203, the positioning data of each positioning terminal is mapped to POIs included in the road networks to obtain POIs associated with the positioning terminal in the road networks.

For example, in step S203, the acquired positioning data of a positioning terminal can be matched with location information of the POIs to determine POIs that the positioning terminal has been at or travelled to. In some embodiments, a region of interest corresponding to a POI can be determined according to coordinates of the POI. When positioning data of a positioning terminal overlaps with the region of interest, it can be determined that the current positioning terminal has been at the POI, thereby matched with the POI. Further, matching can also be carried out according to location coordinates by using a clustering algorithm, specific methods thereof are not described in detail here.

In step S205, a travel route map of each positioning terminal is acquired according to the POIs associated with the positioning terminal in the road networks.

For example, in step S205, movement paths of the positioning terminal between various POIs determined in step S203 can be connected. The number of times that the mobile terminal passes through each movement path within a predetermined time period can be determined, to obtain a travel route map corresponding to the positioning terminal. The predetermined time period can be set based on different time granularities. For example, the time granularity can be set based on intervals such as quarter, month, week, and day, and can vary depending on the characteristics of a particular region.

Figure 3:
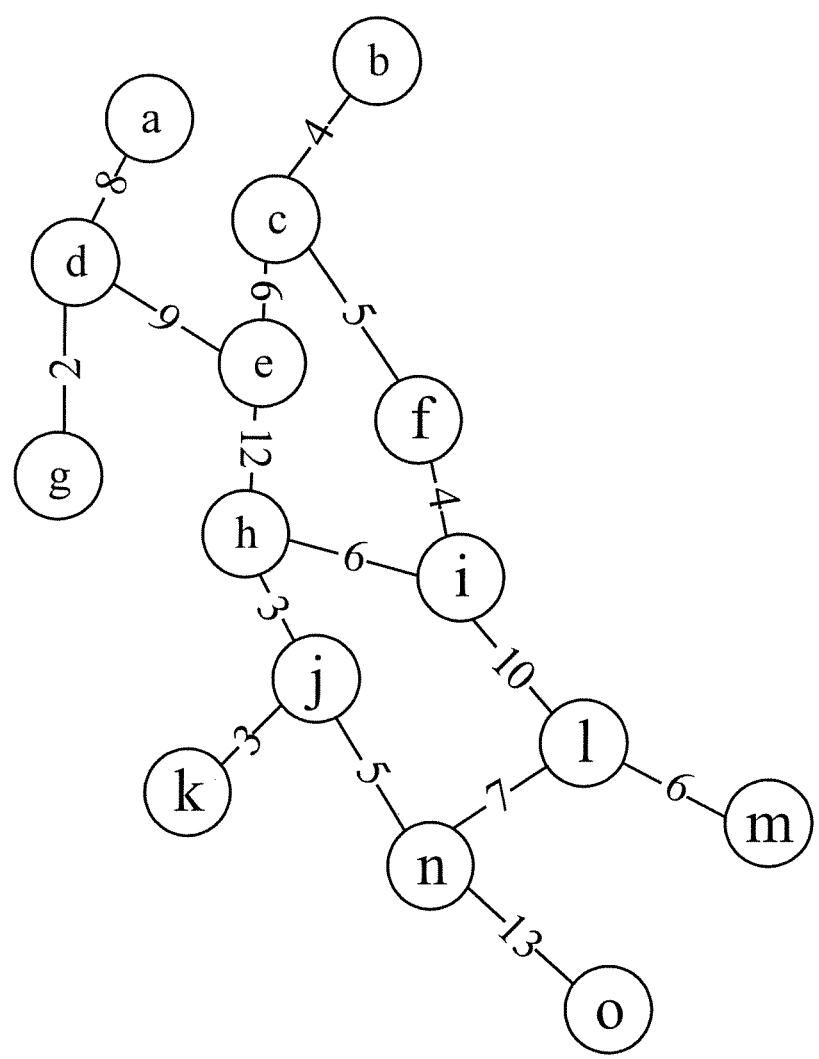
FIG. 3 is a schematic diagram of an exemplary process for determining a preferred travel route, according to some embodiments of the present disclosure.

The description below takes movement data of a user A in one month as an example. As shown in FIG. 3, points "a" to "o" in the figure represent 15 POIs that user A has been at in one month. Movement paths of user A between various POIs can be determined according to the positioning data acquired from, for example, a mobile phone (positioning terminal) of user A in one month. The number of times that user A passes through each movement path can be counted. Thus, a travel route map of user A in one month can be obtained.

In some embodiments, during acquisition of the travel route map, in addition to acquiring the travel route map according to the POIs that the positioning terminal has travelled to, it is also possible to determine movement paths according to the chronological order in which the positioning terminal travels through the POIs. A weight value of each path can be determined according to the number of times that the positioning terminal moves along the path. There are two movement directions in which the positioning terminal moves along one path. In some embodiments, the number of times of movement in each direction can be calculated separately to determine a weight value of the path corresponding to each direction. In other embodiments, the total number of times of movement in the two directions can be combined to calculate a total weight value of the path, implementation of which is not limited by the examples described herein.

In step S207, a preferred travel route of each positioning terminal is acquired according to the travel route map of the positioning terminal.

For example, the travel route map can include the movement paths of the positioning terminal between various POIs and the number of travel times that the positioning terminal travels along each movement path. A preferred travel route corresponding to the positioning terminal can be determined from the travel route map according to the movement paths and the number of travel times.

Figure 4:
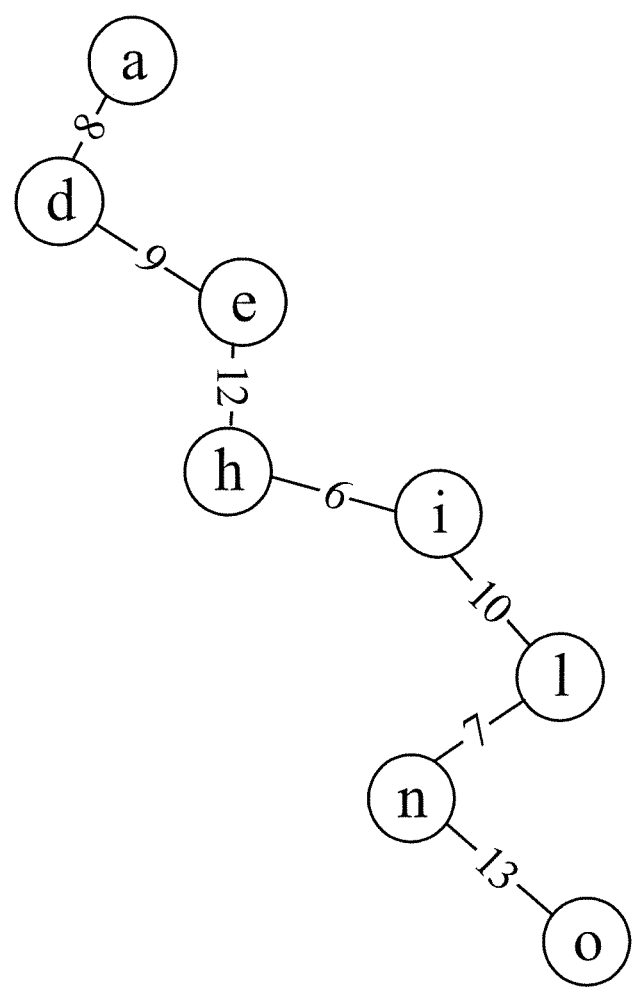
FIG. 4 is a schematic diagram of an exemplary process for determining a preferred travel route, according to some embodiments of the present disclosure.

In the forgoing example regarding travel route map of user A, as shown in FIG. 4, the most frequently used movement paths of user A can be determined according to the movement paths and the number of travel times in the travel route map corresponding to user A. A preferred travel route corresponding to user A can accordingly be determined according to the movement paths between various POIs.

In step S209, the preferred travel routes of the positioning terminals are aggregated to obtain a route popularity distribution map of the road networks.

For example, the preferred travel routes corresponding to different positioning terminals can be aggregated to obtain a route popularity distribution map reflecting popularity of the POIs. The coverage scope of the route popularity distribution map can be defined based on administrative regions or self-defined regions, which are not limited here.

Figure 7:
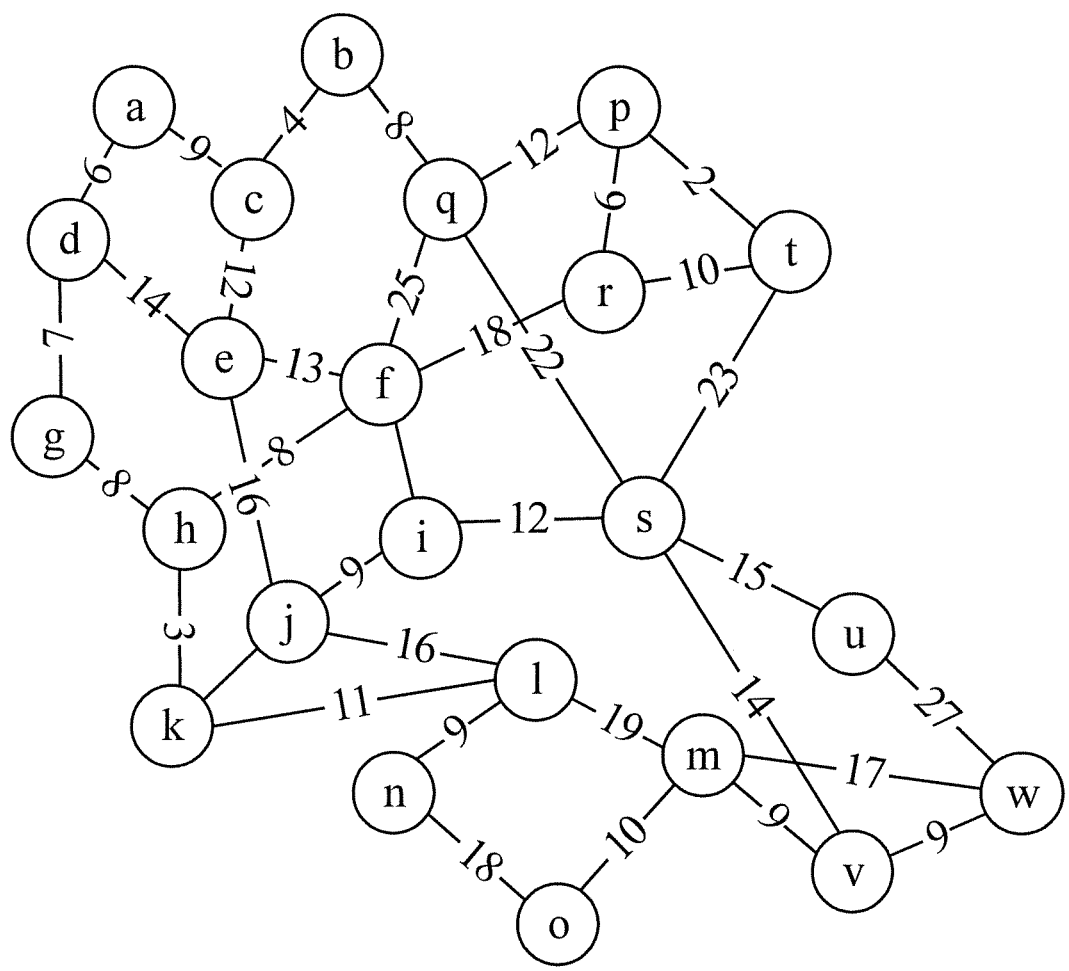
FIG. 7 is a schematic diagram of an exemplary popularity distribution of urban travel routes, according to some embodiments of the present disclosure.

For example, as shown in FIG. 7, preferred travel routes of different positioning terminals can be aggregated by taking POIs in a predetermined region as nodes. With respect to a movement path connecting two nodes, the number of positioning terminals choosing the movement path can be determined. A weighted sum of all movement paths using a POI as an endpoint can be calculated to indicate popularity of the POI. Popularity of all the POIs can be combined to obtain a route popularity distribution map.

Through the above steps S201 to steps S209, the positioning data of each positioning terminal can be mapped to POIs to determine POIs that each positioning terminal has travelled to. A travel route map corresponding to each positioning terminal can be obtained according to the sequence in which the POIs are travelled across. A preferred travel route of each positioning terminal can then be determined by data extraction from the travel route map. The preferred travel routes of the positioning terminals can be aggregated to obtain a route popularity distribution map. The foregoing procedures have the advantages of determining route popularity in road networks without the need of collecting real-time positioning data of positioning terminals. That way, route popularity in road networks can be determined accurately and efficiently, thereby solving the technical problem of low efficiency in determining route popularity in road networks due to complex traffic data extraction and processing procedures.

In some embodiments, step S203 of mapping the positioning data of each positioning terminal to corresponding POIs to obtain POIs associated with the positioning terminal in the road networks can include the following procedures.

In step S2031*a*, a positioning region of a positioning terminal can be determined according to the location information of the positioning terminal during movement in the road networks. A positioning region of each POI included in the road networks can be determined according to geographical location coordinates of the POI.

In step S2033*a*, the positioning region of the positioning terminal can be compared with the positioning region of each POI to obtain an overlap degree therebetween.

In step S2035*a*, at least one POI is determined as the POI associated with the positioning terminal in the road networks, when an overlap degree between the positioning region of the positioning terminal and a positioning region of the at least one POI among the multiple POIs is greater than or equal to a predetermined threshold.

For example, in step S2031*a* to step S2035*a*, a positioning region where the positioning terminal is located can be determined according to the location information of the positioning terminal during movement in the road networks. The positioning region can be a region that the positioning terminal passes through during movement. A positioning region corresponding to each POI can be determined according to location coordinates of the POI. A positioning region corresponding to the positioning terminal can be compared with a positioning region corresponding to a POI, to determine whether the two positioning regions overlap with each other. When the positioning region corresponding to the positioning terminal completely overlaps with the positioning region corresponding to the POI, or when an overlap degree reaches a particular threshold, it can be determined that the positioning terminal has travelled through that particular POI.

In actual applications, certain errors may occur, whether the positioning terminal carries out positioning based on the GPS, the operating base station, or a combination of the GPS and the operating base station. In light of this, multiple location coordinate points acquired by the positioning terminal can be connected, in order to form a movement path of the positioning terminal. A positioning region corresponding to the positioning terminal can be further determined according to the movement path. On the other hand, a POI may represent location coordinates of a certain point on the map. Therefore, in order to improve the accuracy of matching, a region around the location coordinates of a POI can be defined as a positioning region corresponding to the POI.

In some embodiments, step S203 of mapping the positioning data of each positioning terminal to corresponding POIs in the road networks to obtain POIs associated with the positioning terminal can further include the following procedures:

In step S2031*b*, calculation can be performed based on the location information of the positioning terminal during movement in the road networks and geographical location coordinates of each POI included in the road networks by using a GeoHash algorithm, to obtain a positioning value of the positioning terminal and a positioning value of each POI.

In step S2033*b*, the positioning value of the positioning terminal can be matched with the positioning value of each POI to obtain an overlap degree therebetween.

In step S2035*b*, at least one POI can be determined as the POI associated with the positioning terminal in the road networks, when an overlap degree between the positioning value of the positioning terminal and a positioning value of the at least one POI among the multiple POIs is greater than or equal to a predetermined threshold.

In some implementations, a GeoHash algorithm may be used for mapping the positioning data of each positioning terminal to corresponding POIs in the road networks.

In step S2031b to step S2035b, a positioning value corresponding to the positioning terminal and positioning values corresponding to the POIs can be determined by using a GeoHash algorithm. The positioning value corresponding to the positioning terminal can be matched with the positioning values corresponding to the POIs, to determine the overlap degrees therebetween. If the overlap degrees reach a preset threshold, POIs associated with the positioning terminal can be determined.

For example, the two-dimensional longitude and latitude can be converted into a character string by using the GeoHash algorithm. Each character string represents a rectangular region. In other words, points (longitude and latitude coordinates) within the rectangular region share the same GeoHash character string. As such, privacy can be protected (the character string only represents a rough regional location rather than a specific point). Besides, it is easier to cache the character string. A longer character string represents a more precise range. For example, a 5-bit code can represent a rectangular region of 10 square kilometers, while a 6-bit code can represent a more precise region (about 0.34 square kilometer). Similar character strings represent regions that are close to each other. As such, information about POIs nearby can be queried by matching prefixes of character strings. In view of the above, GeoHash can be used for converting longitude and latitude into a character string. A higher matching degree between prefixes of character strings indicate that corresponding regions are within a shorter distance from each other.

According to the above description, it is appreciated that GeoHash can be used as a method for converting longitude and latitude into a character string. A higher matching degree between prefixes of character strings represents a shorter distance between two regions. For example, to query restaurants near a current location, the longitude and latitude of the current location can be converted into a GeoHash character string. A prefix of the GeoHash character string can be matched with a prefix of a GeoHash character string of each of a plurality of restaurants. A higher matching degree represents a shorter distance between the restaurant and the current location.

In some embodiments, the positioning data further includes positioning time points of the positioning terminal during movement in the road networks. Step S205 of obtaining a travel route map of each positioning terminal according to the POIs associated with the positioning terminal in the road networks can include the following procedures:

In step S2051, time points when the positioning terminal travels to the POIs in the road networks are acquired.

In step S2053, multiple POI combinations in which the positioning terminal travels to POIs at consecutive time points are acquired. Each POI combination includes at least two POIs that correspond to consecutive time points. One path can be drawn between the two POIs that correspond to consecutive time points.

In step S2055, the travel route map of the positioning terminal can be generated according to POIs included in each POI combination and paths between the POIs.

While determining the POIs that the positioning terminal has traveled to, it is also possible to acquire time points at which the positioning terminal reaches the POIs. Therefore, multiple POIs that have close or consecutive positioning time points can be determined as a POI combination. POIs that correspond to adjacent time points in each POI combination can be connected to form a path. The travel route map corresponding to the positioning terminal can be generated according to POIs in each POI combination and paths between the POIs.

With reference to FIG. 3, positioning information of user A within a certain period, such as one day, is taken as an example for description. As shown in FIG. 3, first, all POIs that user A has travelled to in the day can be determined and used as nodes. When two nodes appear successively in a chronological order, it can be determined that a path exists between the two nodes. Further, the number of times that user A repeatedly appears on a certain path in the day can be counted and used as a weight value of the path, to construct a travel route map corresponding to user A.

In some embodiments, step S207 of acquiring a preferred travel route of each positioning terminal according to the travel route map of the positioning terminal can include the following procedures.

In step S2071, weight values of paths between any two POIs in the travel route map are obtained. The weight value of a path corresponds to the number of times that the positioning terminal travels along the path in a predetermined period.

In step S2073, an optimal path in the travel route map of the positioning terminal can be acquired by using an optimal path algorithm based on the weight values of the paths between any two POIs in the travel route map. The optimal path can indicate the preferred travel route of the positioning terminal.

For example, after the weight values of the paths between various POIs are acquired, a path with a maximum weight value can be selected. Taking the POIs at two ends of the path as start points respectively, another path with a maximum weight value and a next endpoint can be selected. The process can be performed repeatedly till no other path is connected to a certain endpoint. As such, a preferred travel path as shown in FIG. 4 can be generated.

Figure 5:
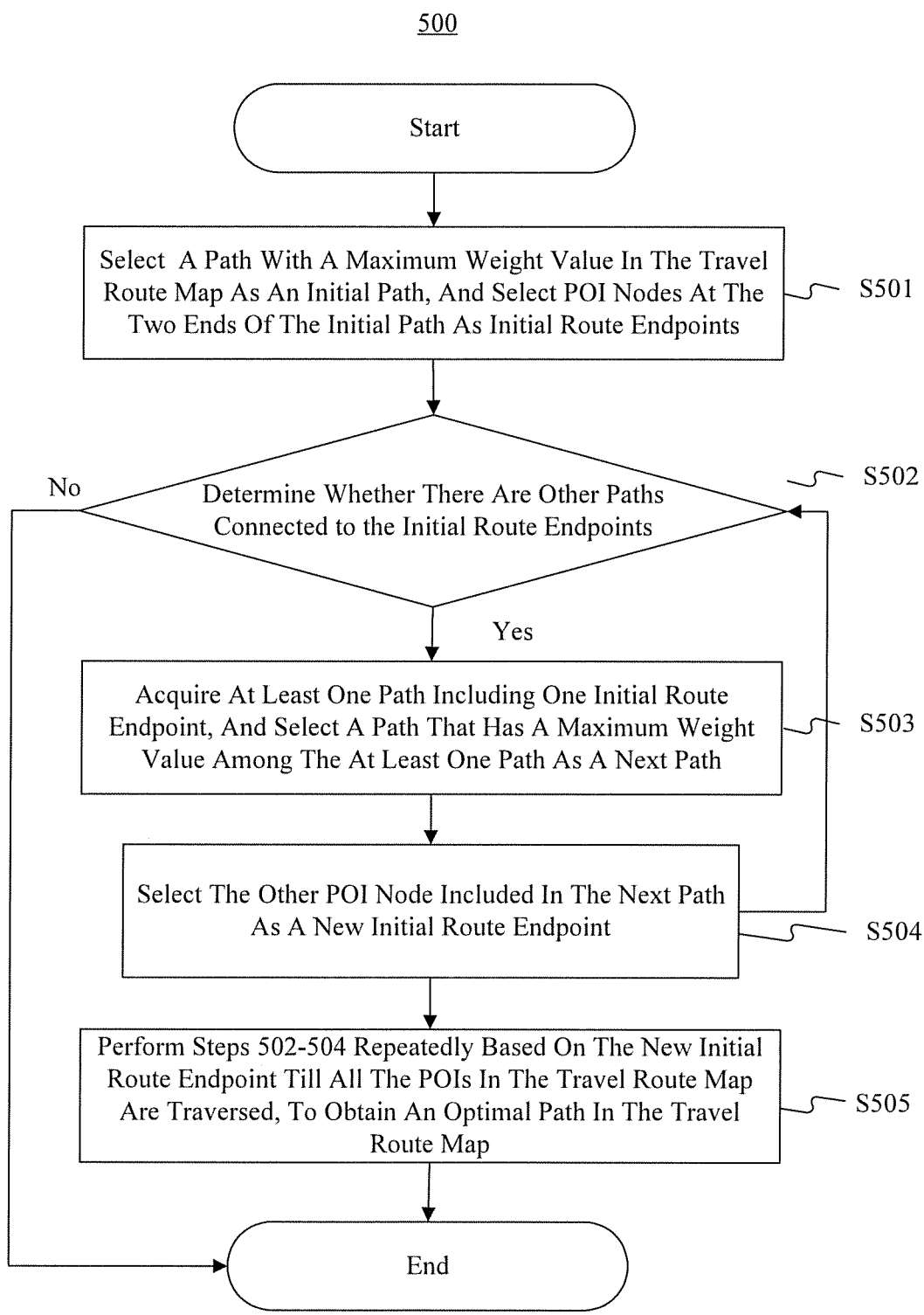
FIG. 5 is a flowchart of an exemplary method for acquiring route popularity in road networks, according to some embodiments of the present disclosure.

In some embodiments, as shown in FIG. 5, step S2073 of acquiring an optimal path in the travel route map of the positioning terminal by using an optimal path algorithm can include the following procedures, as shown in the exemplary process 500.

In step 501, a path with a maximum weight value in the travel route map is selected as an initial path. POI nodes at the two ends of the initial path are taken as initial route endpoints.

In step 502, whether there are other paths connected to the route endpoints can be determined. If it is determined that there are other paths connected to the route endpoints, step 503 can be performed.

In step 503, at least one path including one initial route endpoint is acquired. A path that has a maximum weight value among at least one path can be selected as a next path connected to the initial path.

In step 504, the other POI node included in the next path is selected as a new initial route endpoint.

In step 505, steps 502-504 are performed repeatedly based on the new initial route endpoint till all the POIs in the travel route map are traversed, to obtain an optimal path in the travel route map.

In view of the above, step 501 to step 505 provide an optional method for determining a preferred travel route. First, a path with a maximum weight value can be selected from the travel route map as an initial path, with two initial route endpoints, for determining a preferred travel route.

Then, POIs at two ends of the path are used as initial route endpoints for determining a next path that includes one of the initial path endpoints. A path with a maximum weight value that includes one of the initial path endpoints can be used as a next path connected to the initial path in the preferred travel route. A POI corresponding to the other endpoint of the next path can be selected as a new start endpoint for determining yet another next path in the preferred travel route. A complete preferred travel route can be determined in the travel route map by repeating the foregoing steps.

For further illustration, the travel route map generated according to the positioning information of user A in one day as shown in FIG. 3 is taken as an example. The process for generating a preferred travel route can include the following procedures.

In step 1, a path with a maximum weight value in the travel route map is selected as an initial path. In this example, the path "n-o" with path endpoints "n" and "o" is used as an initial path.

In step 2, the initial route endpoints "n" and "o" are used as base points to acquire a path "n-l" and a path "n-j" that include the initial route endpoint "n" or "o."

In step 3, a path with a maximum weight value in the path "n-l" and the path "n-j" is used as a next path connected to the initial path "n-o" in the optimal path. So in this example, the next path is "n-l".

In step 4, the other POI node "l" included in the path "n-l" is used as an endpoint of a new initial route.

In step 5, step 1 to step 4 are repeated based on the endpoint "l" of the new initial route "n-l," paths "l-i," "i-h," "h-e," "e-d," and "d-a" are then obtained by traversing the nodes. The paths can be connected to obtain an optimal path 400 including "a-d-e-h-i-l-n-o," as shown in FIG. 4.

In some embodiments, the positioning data further includes time points of the positioning terminal during movement in the road networks. The exemplary method 200 can further include the following procedures, after step S203 of mapping the positioning data of each positioning terminal to corresponding POIs.

In step S2041, when the same POI corresponds to multiple pieces of positioning data of the positioning terminal, the multiple pieces of positioning data are sorted based on the corresponding time points.

In step S2043, a piece of positioning data with the earliest time point in the multiple pieces of positioning data is acquired as the positioning data of the positioning terminal corresponding to the POI.

In view of the above, through step S2041 to step S2043, POI positioning data generated by each mobile terminal can be sorted according to a chronological order. In the POI positioning data, if the same POI is associated with the mobile terminal for a number of times successively, the earliest piece of positioning data is acquired. The other repetitive positioning data can be deleted.

Figure 6:
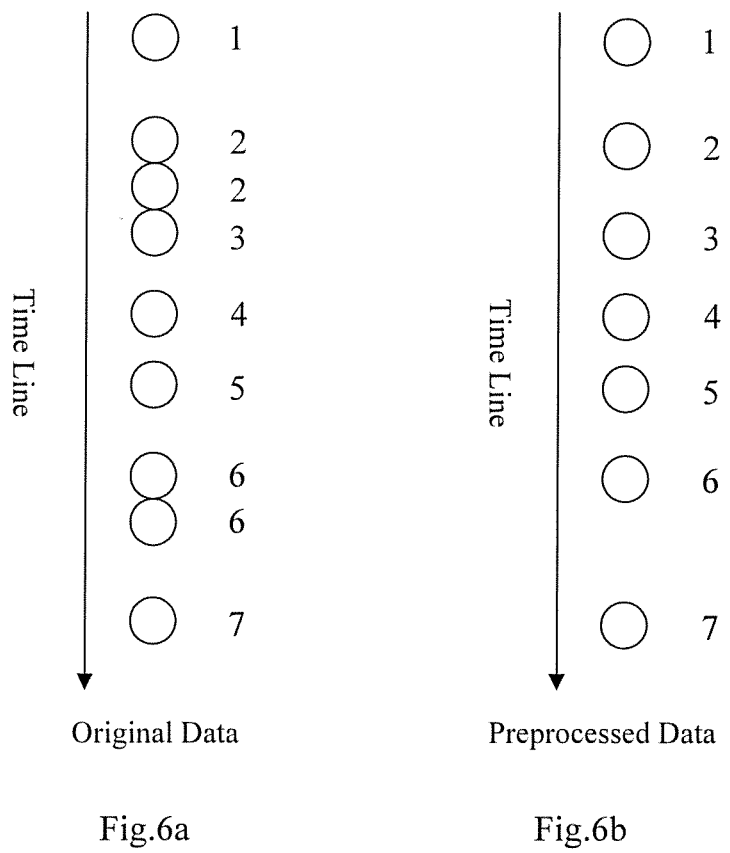
FIG. 6 is a schematic diagram of an exemplary process for preprocessing POI positioning data, according to some embodiments of the present disclosure.

In an exemplary application, as shown in FIG. 6a, when a user stays at the same POI, positioning data of the same POI appears for a number of times successively in the positioning data. Therefore, in order to avoid errors caused by repetitive data, the positioning data can be preprocessed before the travel route is determined. The preprocessing can include: sorting positioning data according to a chronological order; and as shown in FIG. 6b, taking the earliest piece of positioning data associated with the same POI. That way, interference due to repetitive data can be avoided.

In some embodiments, step S209 of aggregating the preferred travel routes of the positioning terminals to obtain a route popularity distribution map of the road networks can include the following procedures.

In step S2091, POIs included in each preferred travel route of the positioning terminals and paths between the POIs are acquired.

In step S2093, identical POIs in each preferred travel route can be merged into one POI, and identical paths in each preferred travel route can be merged into one path, to obtain the route popularity distribution map of the road networks. A weight value of a path obtained after the merging corresponds to the number of merged paths.

In view of the above, through step S2091 to step S2093, POIs included in the preferred travel routes corresponding to all the positioning terminals and paths between the POIs can be acquired. Identical POIs and identical paths corresponding to each positioning terminal can be merged. The number of times that each POI appears in the preferred travel route and the number of times that each path appears in the preferred travel route can be counted and used as weight values, thus obtaining the route popularity distribution map of the road networks. A POI or path with a higher weight value in the route popularity distribution map indicates that it appears more frequently in preferred travel routes.

In an exemplary application, as shown in FIG. 7, preferred travel routes corresponding to all the positioning terminals acquired within a predetermined period are aggregated. The number of times that each POI appears and the number of times that each path appears can be accumulated, respectively, to obtain the weight value of each POI and/or path.

In some embodiments, the exemplary method 200 can further include the following procedures after the route popularity distribution map of the road networks is obtained in step S209.

In step S211, paths associated with each POI in the route popularity distribution map and weight values of the associated paths are obtained.

In step S213, the weight values of the paths associated with each POI are merged to obtain a heat value of the POI.

In step S215, the POIs in the route popularity distribution map are marked or identified according to the heat values of the POIs.

In view of the above, in step S211 to step S215, weight values of associated paths around each POI in the route popularity distribution map of the road networks can be acquired. The weight values of the associated paths can be merged, to obtain a heat value of the POI. The POIs can be marked or identified in the route popularity distribution map based on the heat values of the POIs, to obtain a route popularity distribution map that indicates heat values of the POIs.

In some embodiments, after the route popularity distribution map of the road networks is obtained in step S209, the method 200 can further include the following procedures.

In step S217, the route popularity distribution map of the road networks is output in a predetermined output manner. The output manner can include any one of or a combination of two or more of the following: static image display output, dynamic image display output, two-dimensional image display output, and three-dimensional image display output.

Alternatively, in step S219, the route popularity distribution map can be input to a geographic information system.

Through step S217 or step S219, the generated route popularity distribution map can be displayed in combination with geographical information in one or more manners. For example, in some applications, different display colors can be set for different weight value ranges, thus generating display layers in which weight values are differentiated in colors. Moreover, the display layers can be superimposed with the geographical information to generate a heat map. In some embodiments, columns of different heights may also be generated according to different weight values, and displayed in combination with the geographical information, thus generating a three-dimensional image for display. It is appreciated that the route popularity distribution map can be displayed in other manners, which are not described in detail here.

Figure 8:
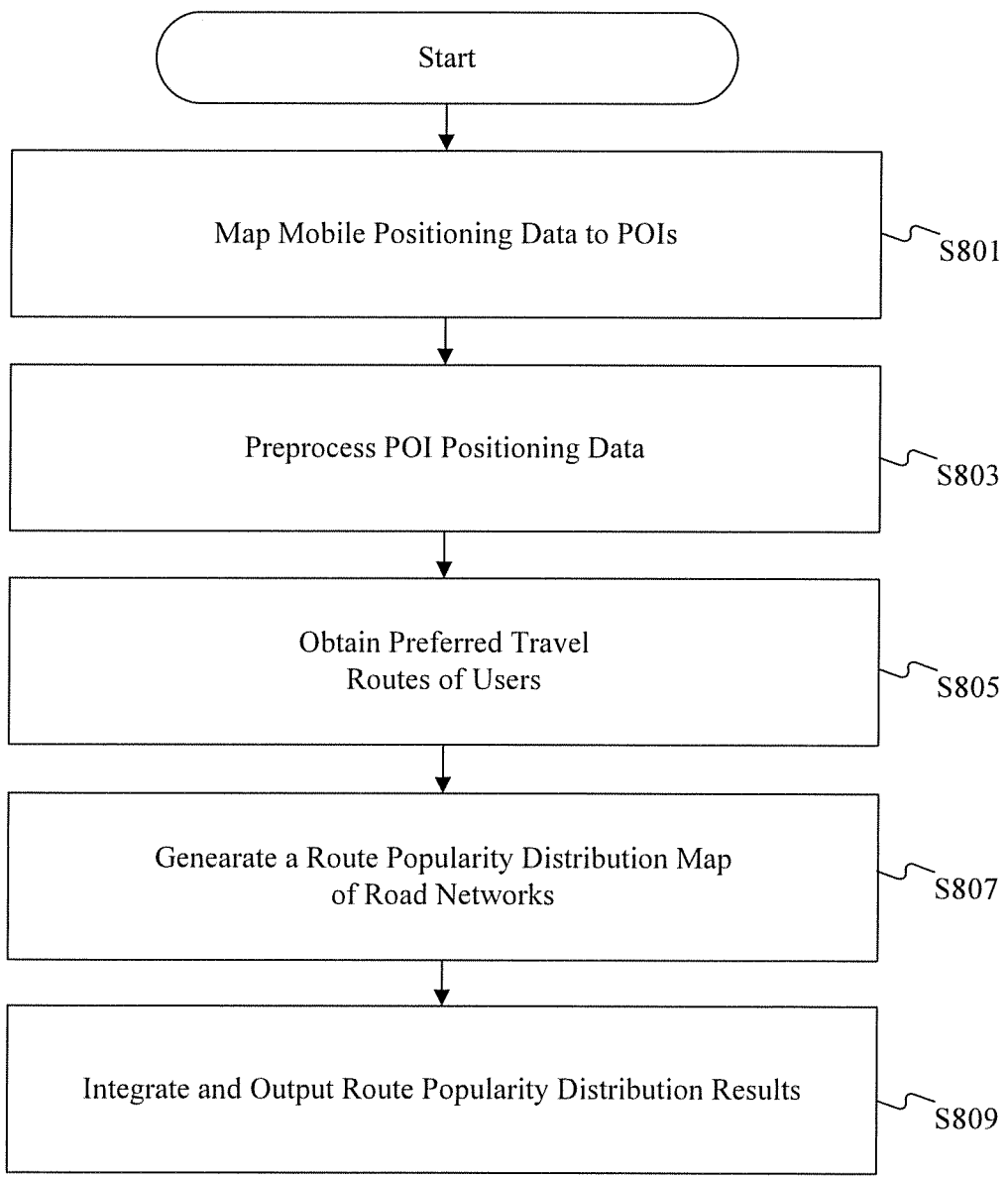
FIG. 8 is a flowchart of an exemplary method for acquiring route popularity in road networks, according to some embodiments of the present disclosure.

FIG. 8 is a flowchart of an exemplary method 800 for acquiring route popularity in road networks, according to some embodiments of the present disclosure. As shown in FIG. 8, the exemplary method 800 includes the following procedures.

In step 801, mobile positioning data is mapped to POIs related to traffic road facilities to generate POI positioning data.

For example, positioning data collected from mobile positioning devices carried by users can be mapped to corresponding POIs related to traffic road facilities according to a predetermined rule, to obtain positioning data associated with the POIs. The mobile positioning device may be a smart device with a GPS navigation module and/or a mobile communications module, for example, a smart phone, a tablet computer, a notebook computer, or the like.

In step 803, the POI positioning data obtained by mapping the mobile positioning data to the POIs is preprocessed.

The POI positioning data of each user within a preset time period can be arranged according to a chronological order. For positioning data associated with the same POI that appears successively, only the earliest piece of data is taken, in order to avoid interference caused by the repetitive data. The time granularity of the preset time period may be defined as month, week, day, hour, or the like, according to the actual implementations.

In step 805, preferred travel routes of the users can be obtained. For example, traffic road-related POIs that a user has travelled to in the preset time period can be used as nodes, and two nodes that appear successively can be connected to construct a travel route map of the user. A preferred travel route of the user can then be obtained based on the constructed travel route map. If the preset time period is a day, then daily preferred travel route of the user can be obtained. For details regarding obtaining preferred travel routes of the users, reference can be made to similar processes described above with respect to the exemplary method 200, details of which are not repeated herein.

In step 807, a route popularity distribution map can be generated based on the preferred travel routes of the users. For example, the daily preferred travel routes of the users can be aggregated. A weight value of each POI and/or path can be determined based on the number of times that the POI and/or route appears in the preferred travel routes. That way, a route popularity distribution map of the road networks of a city can be generated.

In step 809, road names, longitudes and latitudes, POI information and other information can be acquired and integrated with the generated route popularity distribution map of the road networks of the city. The results can be output.

Through the foregoing operations, mobile positioning data of each user accumulated within a preset time period can be combined with POIs related to traffic road facilities to construct a daily travel route map of the user. A daily preferred travel route of the user can be obtained based on the daily travel route map of the user through analysis and calculation. Daily preferred travel routes of different individual users can be merged to generate a travel route popularity distribution map of a city. That way, a route popularity distribution map of road networks of the target city can be obtained. The above methods can address the technical problem of low efficiency in determining route popularity in road networks due to complex traffic data extraction and processing procedures.

Embodiments of the present disclosure can analyze and determine the travel route popularity distribution status of a target city based on mobile positioning data and POI information related to traffic road facilities. The analysis can therefore provide support for urban road planning and traffic construction decision-making by government agencies, and facilitate daily travel route selection by individuals as well.

Based on accumulated positioning data of a positioning terminal in combination with POI information related to traffic road facilities, embodiments of the present disclosure can construct a travel route map corresponding to a user based on matching between the positioning data and the POIs. A daily preferred travel route of the user can be obtained based on the travel route map. A route popularity distribution map of road networks in a city can be constructed based on daily preferred travel routes corresponding to various users within a certain observation period. A travel route popularity analysis result of the target city can therefore be obtained. In view of this, historical positioning data can be used as a data source. The accumulation of positioning data can effectively solve the problem of discontinuity of the positioning data.

Further, the historical data can better reflect regularity. POIs in a geographic information system may cover most trunk roads of a city, which is usually readily available as public data. Accordingly, the operation difficulty and processing costs can be reduced by selecting the POI information related to traffic road facilities. The solutions provided herein can effectively analyze and determine the popularity of major travel routes of a target city based on positioning data of positioning terminals in combination with POIs related to road networks. The analysis can therefore provide support for urban road planning and traffic construction decision-making by government agencies, and facilitate daily travel route selection by individuals as well.

It is appreciated that the foregoing exemplary methods are described as a series of action combinations for ease of description. It is appreciated that the scope of the present disclosure is not limited by the described action sequence. Some steps or procedures can be performed in other sequences or simultaneously in other embodiments. Further, it is appreciated that the embodiments described in the present disclosure are only exemplary. Some steps or modules described herein may be omitted in some actual implementations.

In view of description of the foregoing examples, it is appreciated that the methods provided by the present disclosure can be implemented by software, software combined with a necessary universal hardware platform, or hardware. Further, the technical solutions of the present disclosure can be embodied in a software product. For example, the computer software product can be stored in a storage medium (such as a read-only memory (ROM)/random access memory (RAM), a magnetic disk, or an optical disc), and can include several instructions for enabling a terminal device (which can be a mobile phone, a computer, a server, a network device, or the like) to execute the steps or processes of various embodiments of the present disclosure.

Figure 9:
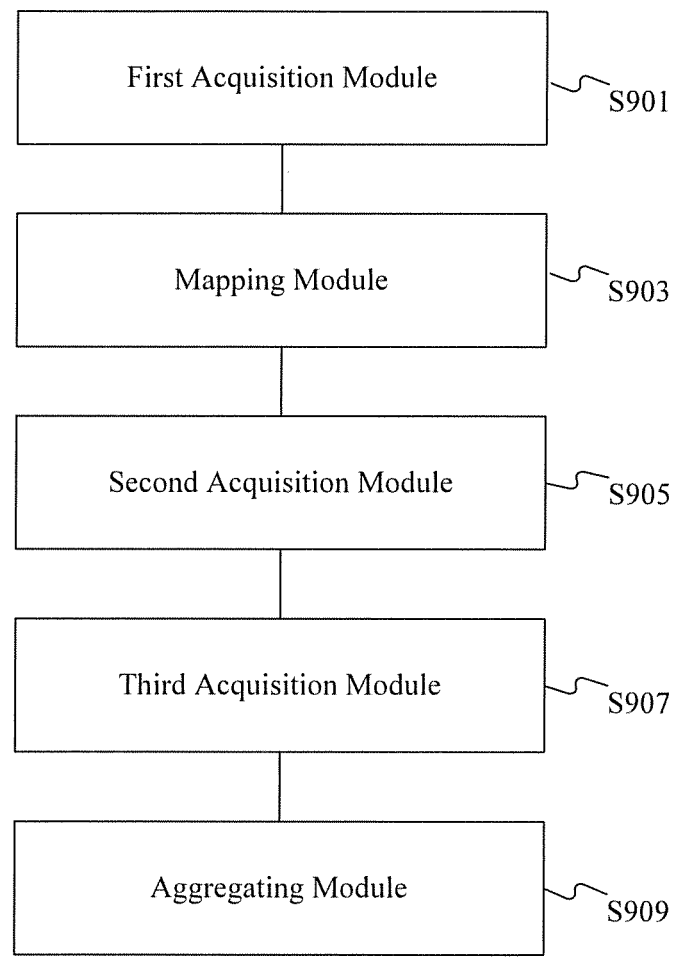
FIG. 9 is a block diagram of an exemplary apparatus for acquiring route popularity in road networks, according to some embodiments of the present disclosure.

According to some embodiments of the present disclosure, apparatuses for acquiring route popularity in road networks are further provided. The apparatuses can be used for implementing the foregoing described methods for acquiring route popularity in road networks. As shown in FIG. 9, an exemplary apparatus 900 comprises a first acquisition module 901, a mapping module 903, a second acquisition module 905, a third acquisition module 907, and an aggregating module 909.

The first acquisition module 901 can be configured to acquire multiple POIs included in road networks and positioning data of multiple positioning terminals. The positioning data can include location information of the positioning terminals during movement in the road networks. The mapping module 903 can be configured to map the positioning data of each positioning terminal to POIs included in the road networks to obtain POIs associated with the positioning terminal. The second acquisition module 905 can be configured to acquire a travel route map of each positioning terminal according to the POIs associated with the positioning terminal in the road networks. The third acquisition module 907 can be configured to acquire a preferred travel route of each positioning terminal according to the travel route map of each positioning terminal. The aggregating module 909 can be configured to aggregate the preferred travel routes of the positioning terminals to obtain a route popularity distribution map of the road networks.

By using the first acquisition module 901, the mapping module 903, the second acquisition module 905, the third acquisition module 907, and the aggregating module 909, the positioning data of each positioning terminal can be mapped to POIs to determine POIs associated with each positioning terminal. A travel route map corresponding to each positioning terminal can be determined according to the sequence in which the POIs are travelled to. A preferred travel route of each positioning terminal can be obtained by data extraction from the travel route map. The preferred travel routes of the positioning terminals can be aggregated to obtain a route popularity distribution map. The foregoing modules have the advantages of determining route popularity in road networks without collecting positioning data of positioning terminals in real time, thus achieving the technical effect of determining route popularity in road networks accurately and efficiently. This can therefore help solving the technical problem of low efficiency in determining route popularity in road networks due to complex traffic data extraction and processing procedures.

Figure 10:
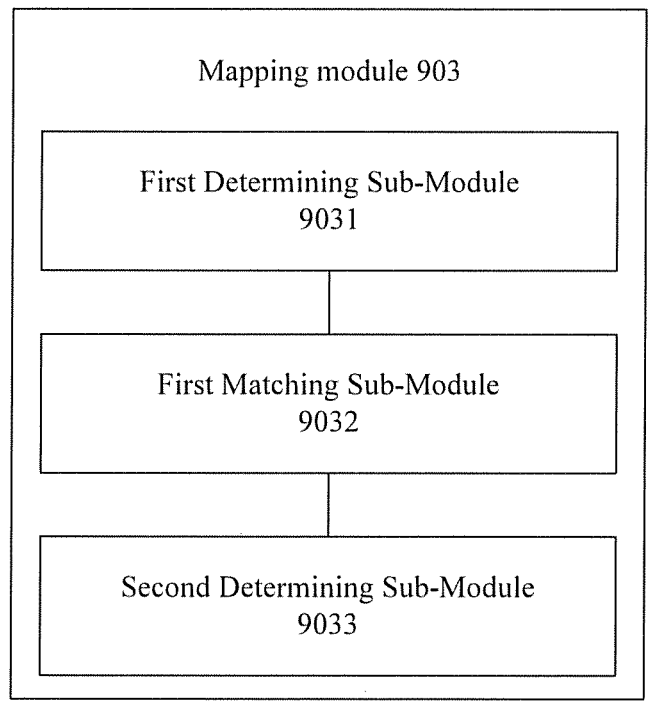
FIG. 10 is a block diagram of a mapping module in an exemplary apparatus for acquiring route popularity in road networks according to some embodiments of the present disclosure.

In some embodiments, the mapping module 903 of the exemplary apparatus 900 can include a first determining sub-module 9031, a first matching sub-module 9032, and a second determining sub-module 9033, as shown in FIG. 10.

The first determining sub-module 9031 can be configured to determine a positioning region of the positioning terminal according to the location information of the positioning terminal during movement in the road networks, and determine a positioning region of each POI included in the road networks according to geographical location coordinates of each POI. The first matching sub-module 9032 can be configured to match the positioning region of the positioning terminal with the positioning region of each POI to obtain an overlap degree therebetween. The second determining sub-module 9033 can be configured to determine at least one POI as the POI associated with the positioning terminal in the road networks, where an overlap degree between the positioning region of the positioning terminal and a positioning region of the at least one POI among the multiple POIs is greater than or equal to a predetermined threshold.

With the first determining sub-module 9031, the first matching sub-module 9032, and the second determining sub-module 9033, a positioning region where the positioning terminal is located can be determined according to the location information of the positioning terminal during movement in the road networks. The positioning region can be a region that the positioning terminal passes through during movement. A positioning region corresponding to each POI can be determined according to location coordinates of the POI. A positioning region corresponding to the positioning terminal can be compared with a positioning region corresponding to a POI, to determine whether the two positioning regions overlap with each other. If the positioning region corresponding to the positioning terminal completely overlaps with the positioning region corresponding to the POI, or if an overlap degree reaches a particular threshold, it can be determined that the positioning terminal has been at or travelled through that particular POI.

Figure 11:
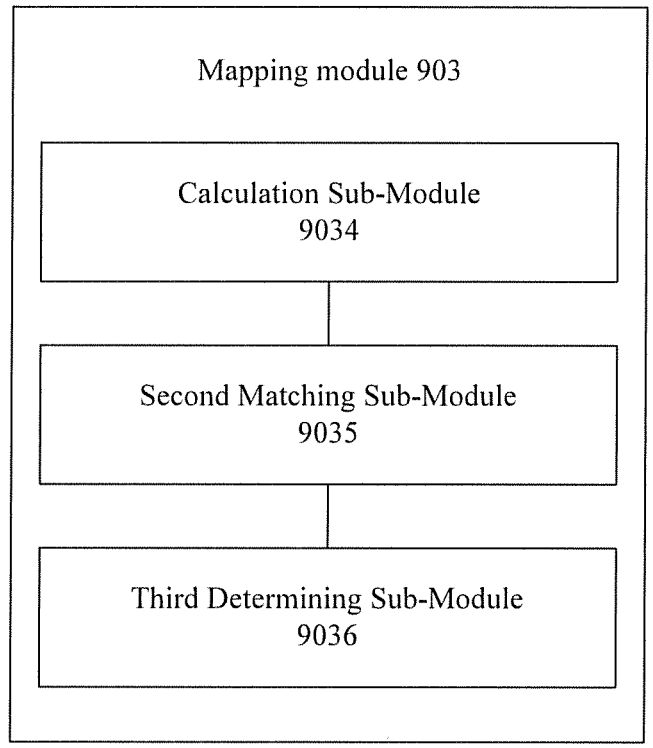
FIG. 11 is a block diagram of a mapping module in an exemplary apparatus for acquiring route popularity in road networks according to some embodiments of the present disclosure.

In some embodiments, the mapping module 903 can further include a calculation sub-module 9034, a second matching sub-module 9035, and a third determining sub-module 9036, as shown in FIG. 11.

The calculation sub-module 9034 can be configured to perform processing on the location information of the positioning terminal during movement in the road networks and geographical location coordinates of each POI included in the road networks by using a GeoHash algorithm, to obtain a positioning value of the positioning terminal and a positioning value of each POI. The second matching sub-module 9035 can be configured to match the positioning value of the positioning terminal with the positioning value of each POI to obtain an overlap degree therebetween. The third determining sub-module 9036 can be configured to determine at least one POI as the POI that the positioning terminal has travelled to in the road networks when an overlap degree between the positioning value of the positioning terminal and a positioning value of the at least one POI among the multiple POIs is greater than or equal to a predetermined threshold.

With the above modules, a GeoHash algorithm may be used for implementing the step of mapping the positioning data of each positioning terminal to the POIs to obtain POIs associated with the positioning terminal in the road networks. With the calculation sub-module 9034, the second matching sub-module 9035, and the third determining sub-module 9036, a positioning value corresponding to the positioning terminal and positioning values corresponding to the POIs can be determined by using the GeoHash algorithm. The positioning value corresponding to the positioning terminal can be matched with the positioning values corresponding to the POIs to determine the overlap degrees therebetween. If the overlap degrees reach a preset threshold, POIs that the positioning terminal has travelled to can be determined accordingly.

Figure 12:
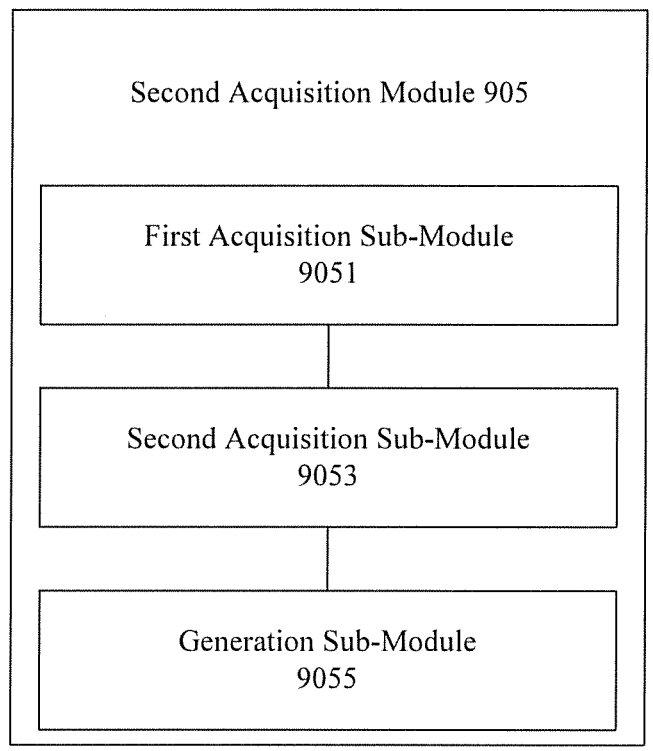
FIG. 12 is a block diagram of a second acquisition module in an exemplary apparatus for acquiring route popularity in road networks according to some embodiments of the present disclosure.

In some embodiments, the positioning data can further include time points of the positioning terminal during movement in the road networks. The second acquisition module 905 can include a first acquisition sub-module 9051, a second acquisition sub-module 9053, and a generation sub-module 9055, as shown in FIG. 12.

The first acquisition sub-module 9051 can be configured to acquire time points corresponding to the POIs that the positioning terminal has travelled to. The second acquisition sub-module 9053 can be configured to acquire multiple POI combinations in which POIs that the positioning terminal has travelled to at consecutive positioning time points. Each POI combination includes at least two POIs that have consecutive positioning time points, and one path is formed between the two POIs that have consecutive positioning time points. The generation sub-module 9055 can be configured to generate the travel route map of the positioning terminal based on POIs included in each POI combination and paths between the POIs.

In an exemplary application, positioning information of a user A in one day is taken as an example for description. As shown in FIG. 3, POIs that user A has travelled to during the day can be counted and used as nodes. When two nodes appear successively in a chronological order, it can be determined that a path exists between the two nodes. The number of times that user A repeatedly appears on a path during the day can be counted and used as a weight value of the path, thereby constructing a travel route map of user A.

Figure 13:
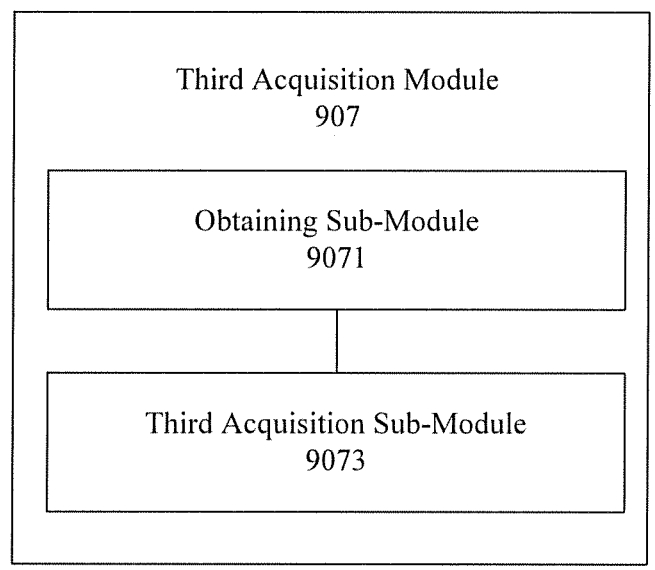
FIG. 13 is a block diagram of a third acquisition module in an exemplary apparatus for acquiring route popularity in road networks according to some embodiments of the present disclosure.

In some embodiments, the third acquisition module 907 of the exemplary apparatus 900 can include an obtaining sub-module 9071 and a third acquisition sub-module 9073 as shown in FIG. 13.

The obtaining sub-module 9071 can be configured to obtain weight values of paths between any two POIs in the travel route map. The weight value of the path corresponds to the number of times that the positioning terminal travels along the path in a predetermined period. The third acquisition sub-module 9073 can be configured to acquire an optimal path in the travel route map of the positioning terminal by using an optimal path algorithm according to the weight values of the paths between any two POIs in the travel route map. The optimal path corresponds to the preferred travel route of the positioning terminal.

For example, after the weight values of the paths between various POIs are acquired, a path with a maximum weight value can be selected first. Then, by taking POIs at two ends of the path as start points, a next path with a maximum weight value and a next endpoint can be selected. The process can then be repeated till no other path is connected to the path endpoint. As such, a preferred travel path as shown in FIG. 4 can be generated.

Figure 14:
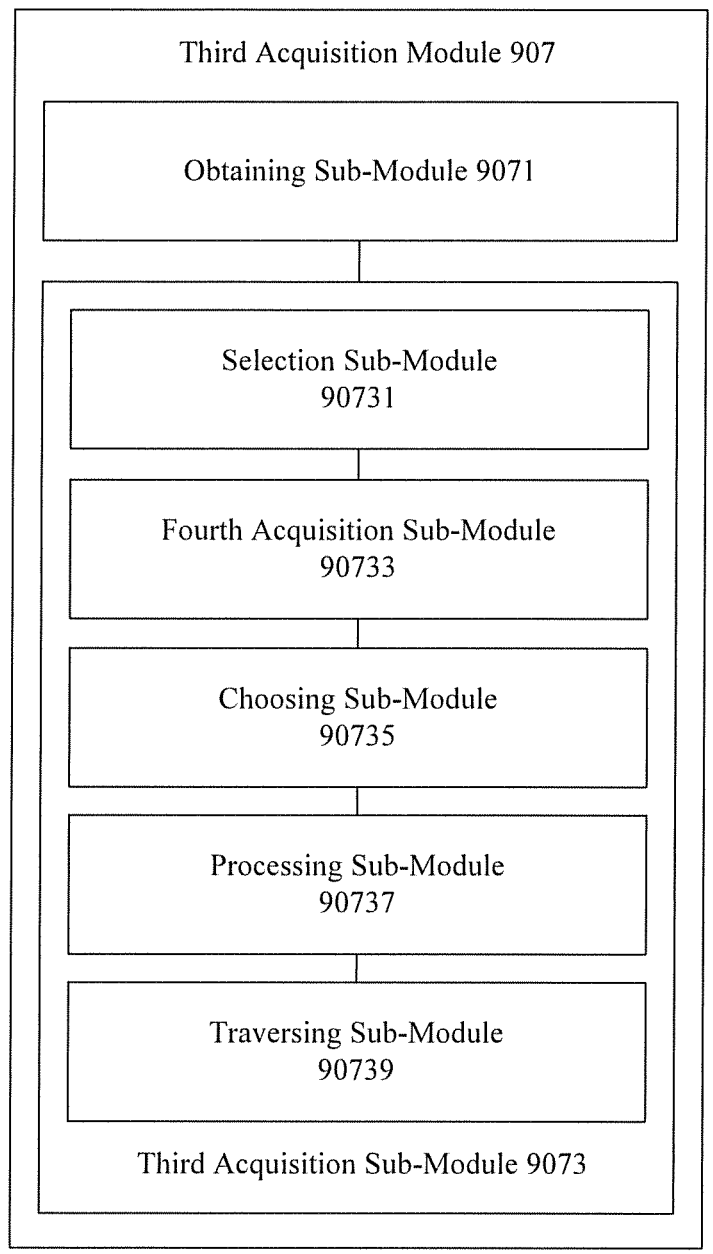
FIG. 14 is a block diagram of a third acquisition module in an exemplary apparatus for acquiring route popularity in road networks, according to some embodiments of the present disclosure.

In some embodiments, the third acquisition sub-module 9073 can include: a selection sub-module 90731, a fourth acquisition sub-module 90733, a choosing sub-module 90735, a processing sub-module 90737, and a traversing sub-module 90739, as shown in FIG. 14.

The selection sub-module 90731 can be configured to select a path with a maximum weight value in the travel route map as an initial path. The POI nodes at two ends of the initial path can be used as initial route endpoints. The fourth acquisition sub-module 90733 can be configured to acquire at least one path that includes one of the initial route endpoint, using with the initial route endpoints as base points. The choosing sub-module 90735 can be configured to choose a path that includes an initial route endpoint and has a maximum weight value as a next path connected to the initial path in the optimal path. The processing sub-module 90737 can be configured to use the other POI node included in the next path as a new initial route endpoint. The traversing sub-module 90739 can be configured to repeatedly run the selection sub-module 90731, the fourth acquisition sub-module 90733, the choosing sub-module 90735 and the processing sub-module 90737 based on the new initial route endpoint till all the POIs in the travel route map are traversed, to obtain the optimal path in the travel route map.

With the selection sub-module 90731, the fourth acquisition sub-module 90733, the choosing sub-module 90735, the processing sub-module 90737, and the traversing sub-module 90739, a preferred travel route can be obtained. First, a path with a maximum weight value can be selected from the travel route map as an initial path, for determining a preferred travel route. The POIs at the two ends of the path are taken as initial path endpoints. The initial path endpoints can be used as base points, to obtain at least one path that includes one initial path endpoint. A path with a maximum weight value in the at least one path including one initial path endpoint is used as a next path connected to the initial path in the preferred travel route. A POI corresponding to the other endpoint of the next path is then used as a new start endpoint for determining yet another next path in the preferred travel route. A complete preferred travel route can be obtained by repeating the foregoing procedures.

Figure 15:
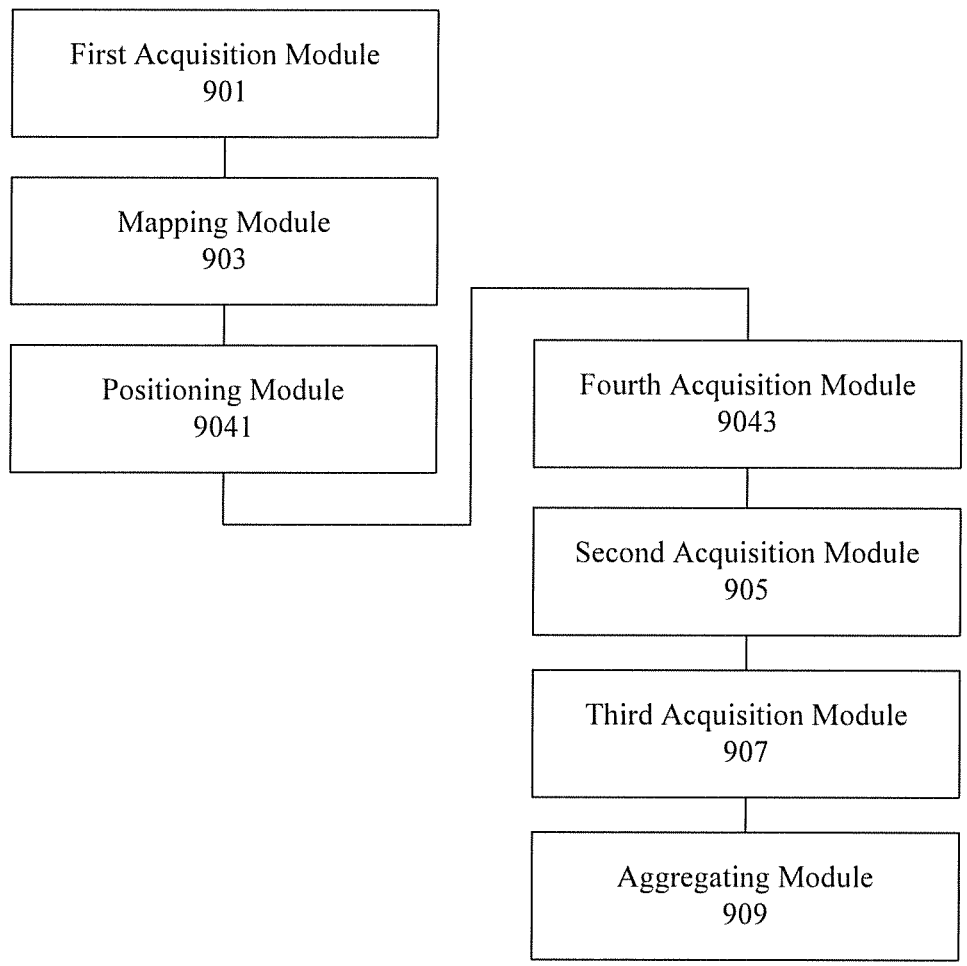
FIG. 15 is a block diagram of an exemplary apparatus for acquiring route popularity in road networks, according to some embodiments of the present disclosure.

In some embodiments, the positioning data further includes time points of the positioning terminal during movement in the road networks. The exemplary apparatus 900 as shown in FIG. 9 can further include a positioning module 9041 and a fourth acquisition module 9043, as shown in FIG. 15.

The positioning module 9041 can be configured to: when the same POI corresponds to multiple pieces of positioning data of the positioning terminal, sort the multiple pieces of positioning data according to the sequence of the corresponding time points of the positioning terminal. The fourth acquisition module 9043 can be configured to acquire a piece of positioning data with the earliest time point in the multiple pieces of positioning data as the positioning data of the positioning terminal corresponding to the POI.

By using the positioning module 9041 and the fourth acquisition module 9043, POI positioning data generated by each mobile terminal can be sorted according to a chronological order. In the POI positioning data, when the same POI is associated with the mobile terminal for a number of times successively, the earliest piece of positioning data can be acquired. The other repetitive positioning data can be deleted.

Figure 16:
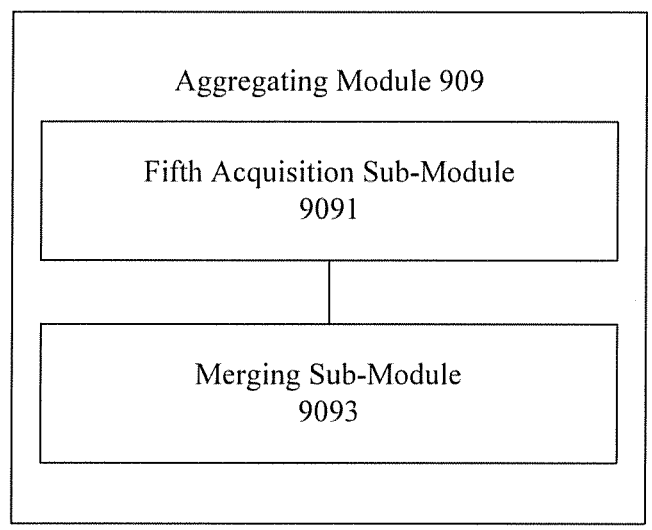
FIG. 16 is a block diagram of an aggregating module in an exemplary apparatus for acquiring route popularity in road networks, according to some embodiments of the present disclosure.

In some embodiments, the aggregating module 909 of the exemplary apparatus 900 can include a fifth acquisition sub-module 9091 and a merging sub-module 9093, as shown in FIG. 16.

The fifth acquisition sub-module 9091 can be configured to acquire POIs included in each preferred travel route of the positioning terminals and paths between the POIs. The merging sub-module 9093 can be configured to merge identical POIs in each preferred travel route into one POI, and merge identical paths in each preferred travel route into one path, to obtain the route popularity distribution map of the road networks. A weight value of a path obtained after the merging corresponds to the number of merged paths.

With the fifth acquisition sub-module 9091 and the merging sub-module 9093, POIs included in the preferred travel routes corresponding to the positioning terminals and paths between the POIs can be acquired. Identical POIs and identical paths corresponding to each positioning terminal can be merged. The number of times that each POI appears in the preferred travel routes and the number of times that each path appears in the preferred travel routes can be counted and used as weight values. A route popularity distribution map of the road networks can therefore be obtained. A POI or path with a higher weight value in the route popularity distribution map indicates it is more frequently used in a preferred travel route.

Figure 17:
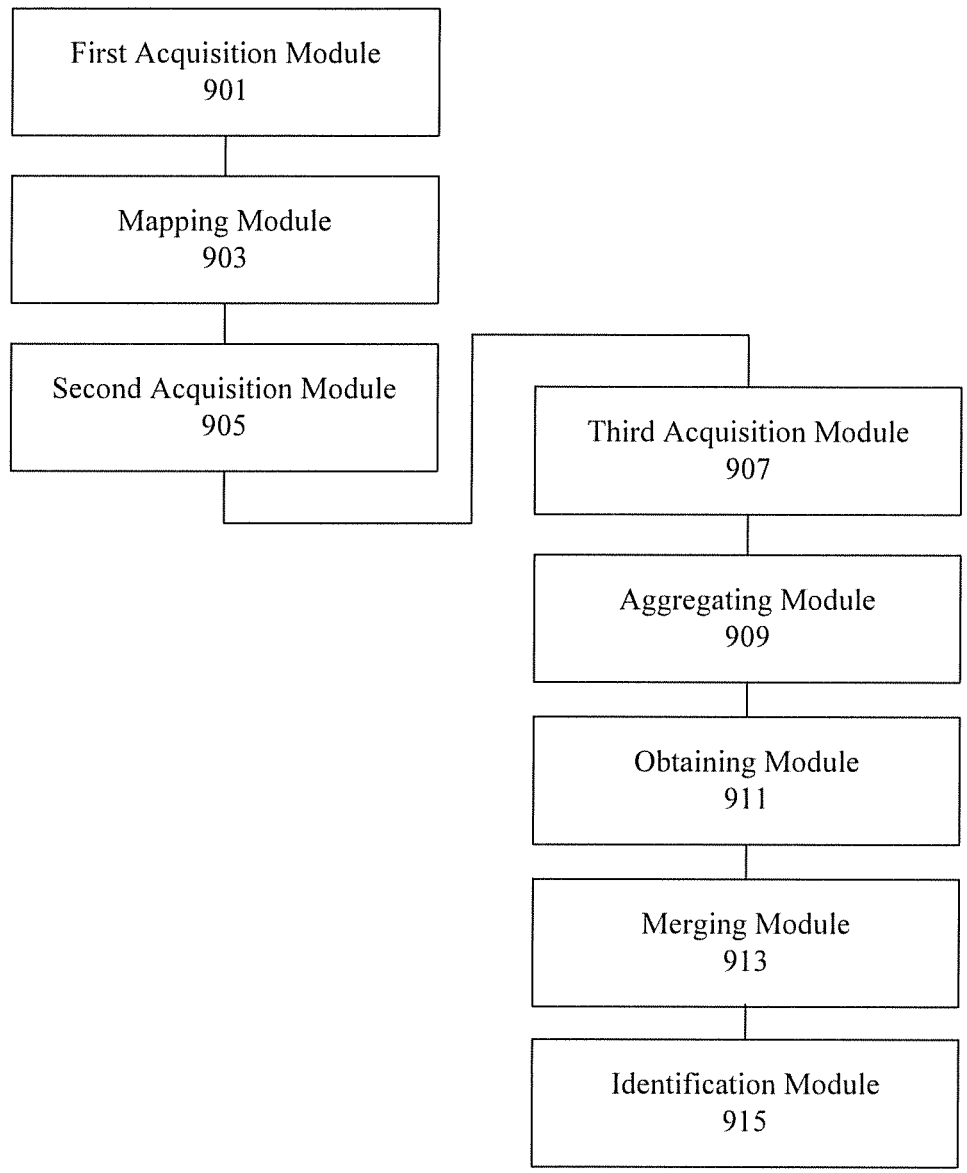
FIG. 17 is a block diagram of an exemplary apparatus for acquiring route popularity in road networks, according to some embodiments of the present disclosure.

In some embodiments, the exemplary apparatus 900 in FIG. 9 can further include an obtaining module 911, a merging module 913, and an identification module 915, as shown in FIG. 17.

The obtaining module 911 can be configured to obtain paths associated with each POI in the route popularity distribution map and weight values of the associated paths.

The merging module 913 can be configured to merge the weight values of the paths associated with the POI to obtain a heat value of the POI. The identification module 915 can be configured to mark or identify the POIs in the route popularity distribution map according to the heat values of the POIs.

With the obtaining module 911, the merging module 913, and the identification module 915, weight values of associated paths around each POI in the route popularity analysis map of the road networks can be acquired. The weight values of the associated paths can be merged, thereby obtaining a heat value of the POI. The POIs can then be marked or identified in the route popularity distribution map based on their heat values.

Figure 18:
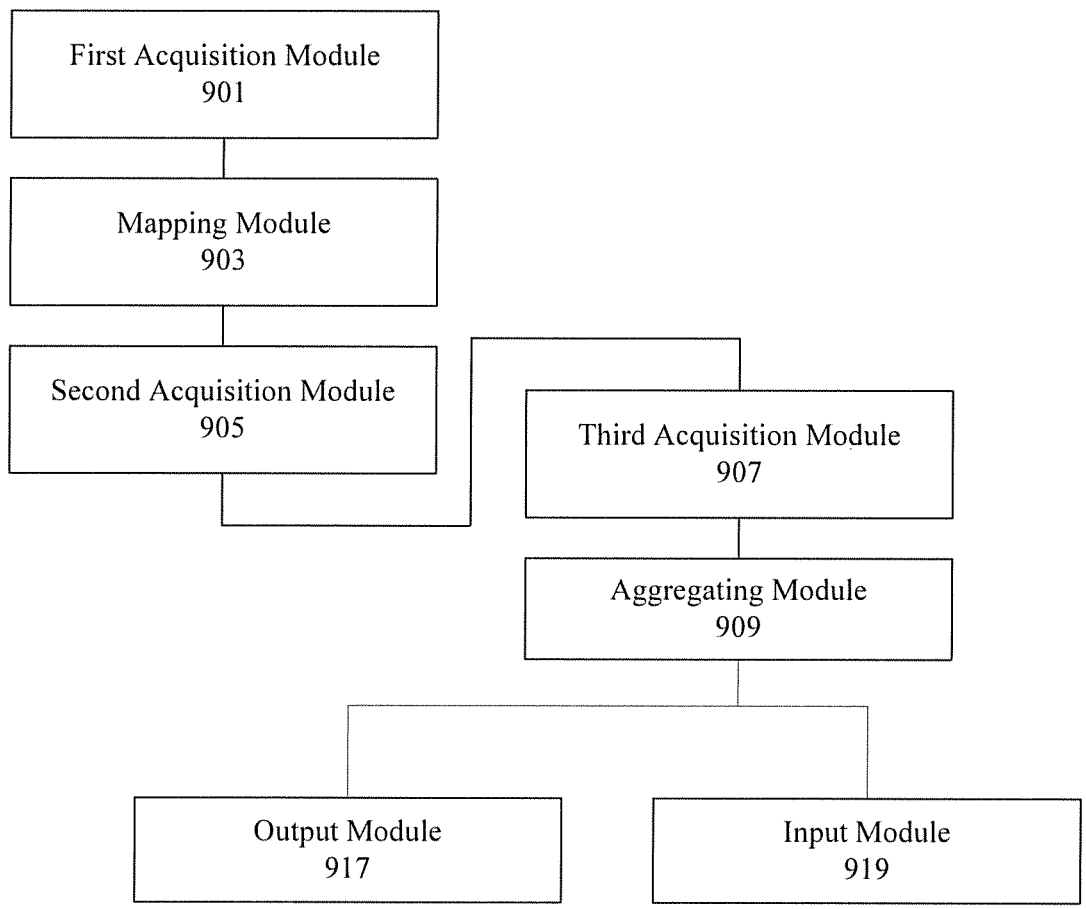
FIG. 18 is a block diagram of an exemplary apparatus for acquiring route popularity in road networks, according to some embodiments of the present disclosure.

In some embodiments, the exemplary apparatus 900 in FIG. 9 can further include an output module 917 and/or an input module 919, as shown in FIG. 18.

The output module 917 can be configured to output the route popularity distribution map of the road networks in a predetermined output manner. The output manner can be any one of or a combination of two or more of the following: static image display output, dynamic image display output, two-dimensional image display output, and three-dimensional image display output. The input module 919 can be configured to input the route popularity distribution map to a geographic information system.

With the output module 917 or the input module 919, the generated route popularity distribution map can be displayed in combination with geographical information in one or more manners. For example, in some implementations, different display colors can be set for different weight value ranges, thus generating display layers in which weight values are differentiated by colors. The display layers can be superimposed with the geographical information to generate a heat map. In some embodiments, columns of different heights can be generated according to different weight values, and can be displayed in combination with the geographical information, thus generating a three-dimensional display image. It is appreciated that the route popularity distribution map can also be displayed in other manners, which are not described in detail here.

According to some embodiments of the present disclosure, computer terminals for acquiring route popularity in road networks are further provided. The computer terminals can be any computer terminal device in a computer terminal group. In some embodiments, the computer terminal can also be a terminal device such as a mobile terminal. In some embodiments, the computer terminal can be at least one network device in multiple network devices located in a computer network.

The computer terminal can execute program codes of the above-described methods. For example, the computer terminal can be terminal 100 as shown in FIG. 1. The computer terminal may also be a terminal device such as a smart phone (such as an Android phone, an iOS phone, or the like), a tablet computer, a palmtop computer, a Mobile Internet Device (MID), a PAD, or the like. FIG. 1 does not limit the structure of the foregoing electronic apparatus. In some embodiments, computer terminal 100 may include more or fewer components (a network interface, a display apparatus, or the like) than those shown in FIG. 1 or have a configuration different from that shown in FIG. 1.

It is appreciated that all or some steps of the various method embodiments described above can be performed via a program instructing related hardware of the terminal device. The program can be stored in a computer readable storage medium. The storage medium can include, for example, a flash disk, a ROM, a RAM, a magnetic disk, an optical disc, or the like.

According to some embodiments of the present disclosure, storage mediums are further provided. The storage medium can be used for storing the program codes corresponding to the above-described methods. In some embodiments, the storage medium can be located in a computer terminal within a computer terminal group in a computer network, or located in a mobile terminal in a mobile terminal group.

In view of the foregoing description, it is appreciated that the disclosed technical solutions may be implemented in other manners. The embodiments described above are only exemplary. For example, the division of the units in the apparatus embodiments is merely a division based on logical functions and there can be other division manners in an actual implementation. Further, a plurality of units or components may be combined or integrated into another system, or some features may be omitted or not performed. In addition, the mutual coupling or direct coupling or communication connections displayed or discussed may be implemented by using some interfaces, and the indirect coupling or communication connections between the units or modules may be implemented electrically or in another form.

The units or modules described as separate parts may or may not be physically separate. Parts displayed as units or modules may or may not be physical units and may be located in the same position or distributed on a plurality of network units. Some or all of the units may be selected or combined according to actual needs to achieve the objectives of the solutions of the embodiments. In addition, functional units or modules in the embodiments of the present disclosure may be integrated into one processing unit, or each of the units may exist alone physically, or two or more units may be integrated into one unit. The integrated unit may be implemented in the form of hardware or may be implemented in the form of a software functional unit.

When the integrated unit is implemented in the form of a software functional unit and sold or used as an independent product, the integrated unit can be stored in a computer readable storage medium. The technical solutions of the present disclosure may be implemented in the form of a software product. The computer software product can be stored in a storage medium and can include several instructions for enabling a computer device (which may be a personal computer, a server, a network device or the like) to perform all or some of the steps of the method embodiments described above the embodiments of the present disclosure.

The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

The foregoing provides some exemplary embodiments of the present disclosure. It should be appreciated that various improvements and modifications can be made, without departing from the principle of the present disclosure, consistent with the present disclosure. Such improvements and modifications shall all fall within the protection scope of the present disclosure.

The invention claimed is:

1. A method for acquiring route popularity in road networks, comprising:

acquiring a plurality of points of interest (POIs) in the road networks and positioning data of a plurality of positioning terminals;

mapping the positioning data of a respective positioning terminal of the plurality of positioning terminals to the plurality of POIs in the road networks to obtain one or more POIs associated with the respective positioning terminal;

acquiring a travel route map of the respective positioning terminal according to the one or more POIs associated with the respective positioning terminal;

acquiring a preferred travel route of the respective positioning terminal according to the travel route map of the respective positioning terminal, the preferred travel route including a plurality of paths frequently used by the respective positioning terminal; and aggregating a plurality of preferred travel routes of the plurality of positioning terminals respectively to obtain a route popularity distribution map of the road networks.

2. The method according to claim 1, wherein mapping the positioning data of the respective positioning terminal to the plurality of POIs in the road networks comprises:

determining a positioning region of the respective positioning terminal according to location information of the respective positioning terminal during movement in the road networks;

determining a positioning region of each POI according to location coordinates of the POI;

comparing the positioning region of the respective positioning terminal with the positioning region of each POI to obtain an overlap degree; and determining at least one POI as the POI associated with the respective positioning terminal in response to an overlap degree between the positioning region of the respective positioning terminal and the positioning region of the at least one POI being greater than or equal to a predetermined threshold.

3. The method according to claim 1, wherein mapping the positioning data of the respective positioning terminal to the plurality of POIs in the road networks comprises:

obtaining a positioning value of the respective positioning terminal and a positioning value of each POI, by using a GeoHash algorithm, based on location information of the respective positioning terminal and location coordinates of each POI;

comparing the positioning value of the respective positioning terminal with the positioning value of each POI to obtain an overlap degree; and determining at least one POI as the POI associated with the respective positioning terminal in response to an overlap degree between the positioning value of the respective positioning terminal and a positioning value of the at least one POI being greater than or equal to a predetermined threshold.

4. The method according to claim 1, wherein the positioning data includes time points of the respective positioning terminal during movement in the road networks, and acquiring a travel route map of the respective positioning terminal according to the one or more POIs associated with the respective positioning terminal comprises:

acquiring time points corresponding to the one or more POIs associated with the respective positioning terminal;

acquiring multiple POI combinations, wherein each combination includes at least two POIs with consecutive time points; and generating the travel route map of the respective positioning terminal according to POIs included in each POI combination and paths between the POIs.

5. The method according to claim 4, wherein acquiring a preferred travel route of the respective positioning terminal according to the travel route map of the respective positioning terminal comprises:

obtaining weight values of paths between each two POIs in the travel route map, a weight value of a path corresponding to a number of times that the respective positioning terminal travels along the path within a predetermined period; and acquiring a first path of the respective positioning terminal based on the weight values of the paths.

6. The method according to claim 5, wherein acquiring the first path of the respective positioning terminal based on the weight values of the paths comprises:

selecting a path with a maximum weight value in the travel route map as an initial path, POIs of the initial path being initial route endpoints;

acquiring at least one other path including one initial route endpoint;

choosing, among the at least one other path, a path that has a maximum weight value as a next path connected to the initial path in the first path;

using the other POI of the next path as a new initial route endpoint; and performing the selecting, acquiring, choosing, and using steps based on the new initial route endpoint, till the POIs in the travel route map are traversed.

7. The method according to claim 1, wherein the positioning data includes time points of the respective positioning terminal during movement in the road networks, and the method further comprises:

in response to a same POI corresponding to multiple pieces of positioning data, sorting the multiple pieces of positioning data according to the corresponding g time points; and acquiring a piece of positioning data with an earliest time point among the multiple pieces of positioning data.

8. The method according to claim 1, wherein aggregating the preferred travel routes of the plurality of positioning terminals to obtain a route popularity distribution map of the road networks comprises:

acquiring POIs included in the preferred travel routes of the plurality of positioning terminals and the plurality of paths between the POIs; and obtaining the route popularity distribution map by merging identical POIs into one POI and merging identical paths into one path, wherein a weight value of a path obtained after the merging corresponds to a number of merged paths.

9. The method according to claim 8, further comprising:

obtaining weight values of paths associated with one or more POIs in the route popularity distribution map;

obtaining a heat value of each of the one or more POIs in the route popularity distribution map by merging the weight values of the paths associated with each of the one or more POIs; and identifying the one or more POIs in the route popularity distribution map based on the obtained heat values.

10. The method according to claim 1, further comprising:
outputting the route popularity distribution map, the output manner including at least one of static image display output, dynamic image display output, two-dimensional image display output, and three-dimensional image display output; or
inputting the route popularity distribution map to a geographic information system.

11. An apparatus for acquiring route popularity in road networks, comprising:
a memory storing a set of instructions; and
a processor configured to execute the set of instructions to cause the apparatus to perform:
acquiring a plurality of POIs in the road networks and positioning data of a plurality of positioning terminals;
mapping the positioning data of a respective positioning terminal of the plurality of positioning terminals to the plurality of POIs in the road networks to obtain one or more POIs associated with the respective positioning terminal;
acquiring a travel route map of the respective positioning terminal according to the one or more POIs associated with the respective positioning terminal;
acquiring a preferred travel route of the respective positioning terminal according to the travel route map of the respective positioning terminal, the preferred travel route including a plurality of paths frequently used by the respective positioning terminal; and
aggregating a plurality of preferred travel routes of the plurality of positioning terminals respectively to obtain a route popularity distribution map of the road networks.

12. The apparatus according to claim 11, wherein mapping the positioning data of the respective positioning terminal to the plurality of POIs in the road networks involves the processor being configured to execute the set of instructions to cause the apparatus to further perform:
determining a positioning region of the respective positioning terminal according to location information of the respective positioning terminal during movement in the road networks;
determine a positioning region of each POI according to location coordinates of the POI;
comparing the positioning region of the respective positioning terminal with the positioning region of each POI to obtain an overlap degree; and
determining at least one POI as the POI associated with the respective positioning terminal, if an overlap degree between the positioning region of the respective positioning terminal and the positioning region of the at least one POI is greater than or equal to a predetermined threshold.

13. The apparatus according to claim 11, wherein mapping the positioning data of the respective positioning terminal to the plurality of POIs in the road networks involves the processor being configured to execute the set of instructions to cause the apparatus to further perform:
obtaining a positioning value of the respective positioning terminal and a positioning value of each POI, by using a GeoHash algorithm, based on location information of the respective positioning terminal during movement in the road networks and location coordinates of each POI;
comparing the positioning value of the respective positioning terminal with the positioning value of each POI to obtain an overlap degree; and
determining at least one POI as the POI associated with the respective positioning terminal, if an overlap degree between the positioning value of the positioning terminal and the positioning value of the at least one POI is greater than or equal to a predetermined threshold.

14. The apparatus according to claim 11, wherein the positioning data includes time points of the respective positioning terminal during movement in the road networks, and acquiring a travel route map of the respective positioning terminal according to the one or more POIs associated with the respective positioning terminal involves the processor being configured to execute the set of instructions to cause the apparatus to further perform:
acquiring time points corresponding to the one or more POIs associated with the respective positioning terminal;
acquiring multiple POI combinations, wherein each POI combination includes at least two POIs with consecutive time points; and
generating the travel route map of the respective positioning terminal according to POIs in each POI combination and paths between the POIs.

15. The apparatus according to claim 14, wherein acquiring a preferred travel route of the respective positioning terminal according to the travel route map of the respective positioning terminal involves the processor being configured to execute the set of instructions to cause the apparatus to further perform:
obtaining weight values of paths between each two POIs in the travel route map, a weight value of a path corresponding to a number of times that the respective positioning terminal travels along the path within a predetermined period; and
acquiring a first path of the respective positioning terminal based on the weight values of the paths.

16. The apparatus according to claim 15, wherein acquiring the first path of the respective positioning terminal based on the weight values of the paths involves the processor being configured to execute the set of instructions to cause the apparatus to further perform:
selecting a path with a maximum weight value in the travel route map as an initial path, POIs of the initial path being initial route endpoints;
acquiring at least one other path including one initial route endpoint;
choosing, among the at least one other path, a path that has a maximum weight value as a next path connected to the initial path in the first path;
using the other POI included in the next path as a new initial route endpoint; and
performing the selecting, acquiring, choosing, and using steps based on the new initial route endpoint, till the POIs in the travel route map are traversed.

17. The apparatus according to claim 11, wherein the positioning data includes time points of the respective positioning terminal during movement in the road networks, and after mapping the positioning data of the respective positioning terminal to the POIs in the road networks, the processor is further configured to execute the set of instructions to cause the apparatus to further perform:
if a same POI corresponds to multiple pieces of positioning data, sorting the multiple pieces of positioning data according to the corresponding g time points; and acquiring a piece of positioning data with an earliest time point among the multiple pieces of positioning data.

18. The apparatus according to claim 11, wherein aggregating the preferred travel routes of the plurality of positioning terminals to obtain a route popularity distribution map of the road networks involves the processor being configured to execute the set of instructions to cause the apparatus to further perform:
acquiring POIs included in each preferred travel route of the positioning terminals and the plurality of paths between the POIs; and
obtaining the route popularity distribution map by merging identical POIs into one POI and merging identical paths into one path, wherein a weight value of a path obtained after the merging corresponds to a number of merged paths.

19. The apparatus according to claim 18, wherein the processor is further configured to execute the set of instructions to cause the apparatus to perform:
obtaining weight values of paths associated with one or more POIs in the route popularity distribution map;
obtaining a heat value of each of the one or more POIs in the route popularity distribution map by merging the weight values of the paths associated with each of the one or more POIs; and
identifying the one or more POIs in the route popularity distribution map based on the obtained heat values.

20. The apparatus according to claim 11, wherein the processor is further configured to execute the set of instructions to cause the apparatus to perform:
outputting the route popularity distribution map, the output manner including at least one of static image display output, dynamic image display output, two-dimensional image display output, and three-dimensional image display output; or
inputting the route popularity distribution map to a geographic information system.

21. A non-transitory computer readable medium that stores a set of instructions that is executable by at least one processor of a server to cause the server to perform a method for acquiring route popularity in road networks, the method comprising:
acquiring a plurality of points of interest (POIs) in the road networks and positioning data of a plurality of positioning terminals;
mapping the positioning data of a respective positioning terminal of the plurality of positioning terminals to the plurality of POIs in the road networks to obtain one or more POIs associated with the respective positioning terminal;
acquiring a travel route map of the respective positioning terminal according to the one or more POIs associated with the respective positioning terminal;
acquiring a preferred travel route of the respective positioning terminal according to the travel route map of the respective positioning terminal, the preferred travel route including a plurality of paths frequently used by the respective positioning terminal; and
aggregating a plurality of preferred travel routes of the plurality of positioning terminals respectively to obtain a route popularity distribution map of the road networks.

* * * * *